(12) United States Patent
Trui et al.

(10) Patent No.: US 9,851,045 B2
(45) Date of Patent: *Dec. 26, 2017

(54) TWELVE AXES MECHANISM FOR SPHERICAL COORDINATE KINEMATICS

(71) Applicant: Wen-Der Trui, Taichung (TW)

(72) Inventors: Wen-Der Trui, Taichung (TW); Shu-Ching Lin, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,841

(22) Filed: Jan. 16, 2017

(65) Prior Publication Data

US 2017/0205022 A1 Jul. 20, 2017

(30) Foreign Application Priority Data

Jan. 15, 2016 (TW) .............................. 105101295 A

(51) Int. Cl.
| | | |
|---|---|---|
| *B25J 17/00* | (2006.01) | |
| *F16M 11/12* | (2006.01) | |
| *B23Q 1/50* | (2006.01) | |
| *G01B 5/004* | (2006.01) | |
| *B25J 9/00* | (2006.01) | |
| *F16M 11/18* | (2006.01) | |

(52) U.S. Cl.
CPC .............. *F16M 11/123* (2013.01); *B23Q 1/50* (2013.01); *B25J 9/00* (2013.01); *B25J 9/0048* (2013.01); *F16M 11/18* (2013.01); *G01B 5/004* (2013.01)

(58) Field of Classification Search
CPC ......... G09B 9/04; F16M 11/123; B25J 9/0048

USPC ...... 248/276.1; 472/57, 59, 130, 47; 434/55, 434/59; 74/490.01
See application file for complete search history.

(56) References Cited

U.S. PATENT DOCUMENTS

| 8,579,714 B2* | 11/2013 | Trui ....................... A63G 31/00 |
| | | 472/57 |
| 9,579,786 B2* | 2/2017 | Trui ..................... F16M 11/123 |
| 2013/0209967 A1* | 8/2013 | Guehring ................ G09B 9/04 |
| | | 434/33 |

(Continued)

FOREIGN PATENT DOCUMENTS

| CN | 2564840 Y | 8/2003 |
| EP | 2863102 A1 | 4/2015 |

*Primary Examiner* — Todd M Epps

(57) ABSTRACT

A mechanism geometrically constituted with twelve axes can be manipulated for spherical coordinate kinematics. Concerning the major improvement of the invention, one of the two geometric tetrahedron frames which were ever specified by our two pre-inventions (U.S. Pat. No. 8,579,714 B2/US20120083347A1 and US20150082934A1) is decoupled and reconstructed as two separated terminal frames which are constituted by two individual geometric arcs. The other one of the two geometric tetrahedron frames without changing its original geometric definition is inherited in the invention and renamed as a base frame. Comparing to the original single geometric tetrahedron, the mechanism newly developed by two individual geometric arcs is suffering fewer constraints and gaining more work space. If a terminal saddle is equipped onto a terminal frame, the newly developed mechanism can be increased extra payload capability. Therefore, this improvement is substantially extending the utility of twelve axes mechanism for spherical coordinate kinematics.

13 Claims, 28 Drawing Sheets

(56) References Cited

U.S. PATENT DOCUMENTS

2015/0323414 A1* 11/2015 In .......................... G09B 9/04
                                                    73/11.07
2015/0356878 A1* 12/2015 Warmerdam ............ G09B 9/00
                                                    73/865.6

* cited by examiner

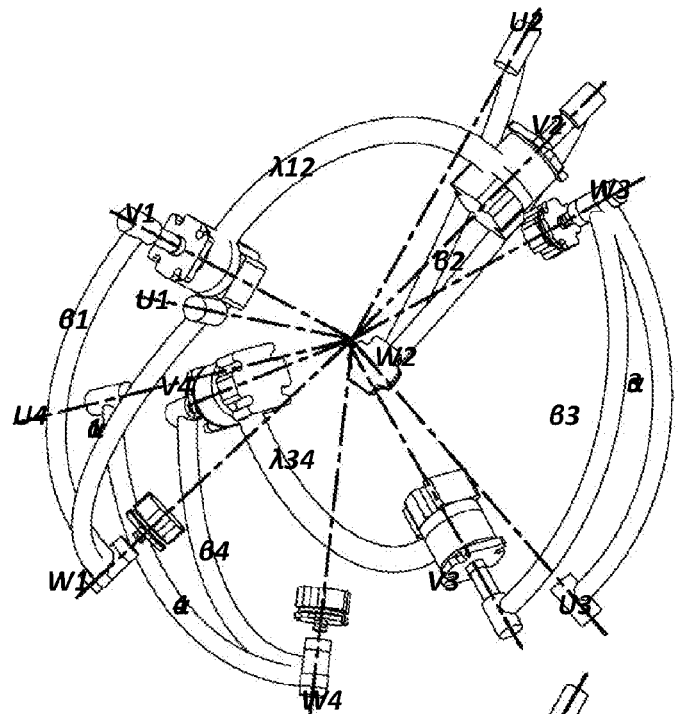
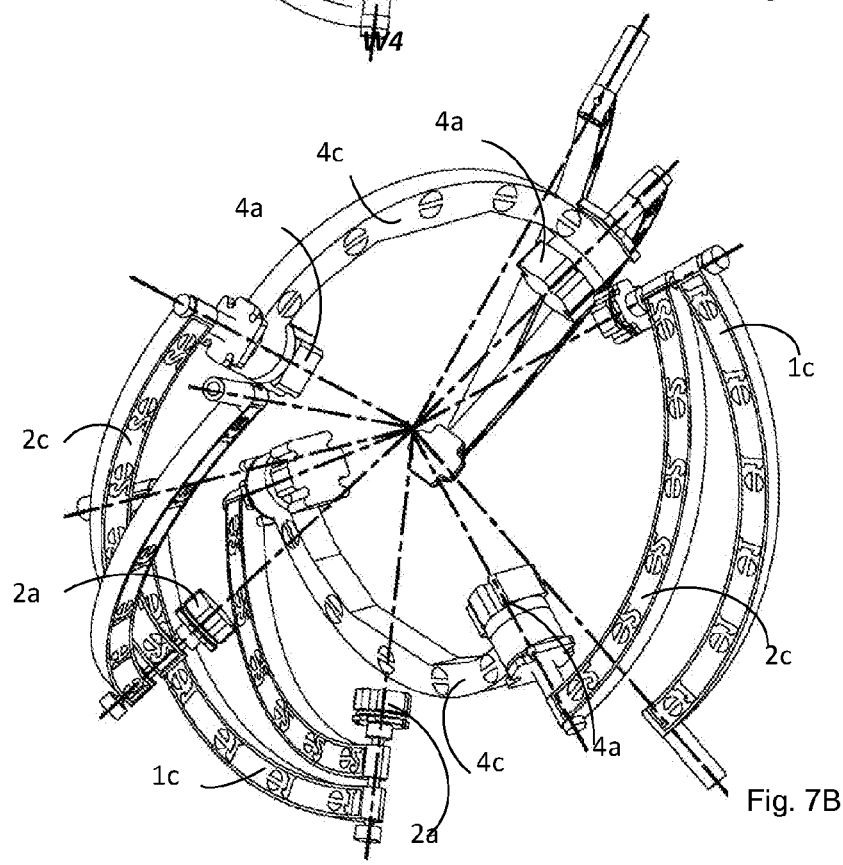

US 9,851,045 B2

TWELVE AXES MECHANISM FOR SPHERICAL COORDINATE KINEMATICS

BACKGROUND OF THE INVENTION

Field of the Invention

A mechanism geometrically constituted with twelve axes can be manipulated for spherical coordinate kinematics. This mechanism is able to implement in multi-shaft composite machining center and coordinate measuring machine or apply as a robot's shoulder joint and hip joint.

Description of Related Art

The invention is referred to the applicant's two pre-inventions, the first pre-invention is issued by USPTO (U.S. Pat. No. 8,579,714B2/US20120083347A1), and the second pre-invention has sequentially received notice of allowance from USPTO (US20150082934A1)

The invention is inherited the same twelve axes geometric configuration from our two pre-inventions. An important issue is how to make a twelve axes mechanism operate smoothly without mutual interference and/or singularity while contemplating practical design and regulating geometric limitation. Therefore, the invention is directed to a new approach regarding to interference and singularity avoidance in comparing to our first pre-invention. After synthesizing our two pre-inventions, four orbit specifications are classified. More especially, "at least one" end effect arc-link assemblies introduced in our second pre-invention are improved as "at most two" crank sets in the invention. Concerning the major improvement of the invention, one of the two geometric tetrahedron frames which were ever specified by our two pre-inventions is decoupled and reconstructed as two separated terminal frames which are constituted by two individual geometric arcs. The other one of the two geometric tetrahedron frames without changing its original geometric definition is inherited in the invention. Comparing to the original single geometric tetrahedron, the mechanism newly developed by two individual geometric arcs is suffering fewer constraints and gaining more work space. If a terminal saddle is equipped onto a terminal frame, the newly developed mechanism can be increased extra payload capability. Therefore, this improvement is substantially extending the utility of twelve axes mechanism for spherical coordinate kinematics.

The above and other objects, features and advantages of the invention will become apparent from the following detailed description taken with the accompanying drawings.

SUMMARY OF THE INVENTION

It is one objective of the present disclosure to provide a mechanism geometrically constituted with twelve axes configured to be manipulated for spherical coordinate kinematics.

A twelve axes mechanism includes a base frame, two terminal frame sets, four arc-link sets, and at most two crank sets. The base frame set comprises a base frame including a plurality of brackets and four base rotating modules installed into the base frame. Each terminal frame set comprises a terminal frame and two terminal rotating modules installed into the terminal frame. Each arc-link set comprises a base arc-link, a terminal arc-link and an arc-link rotating module. Each crank set comprises an arc crank and a crank rotating module. There are total twelve axes in the mechanism for pivoting with four base rotating modules, four arc-link rotating modules and four terminal rotating modules individually, and each axis of theses rotating modules is specifically directed into the center of the base frame for concentrically rotating each arc-link set along a specified geometric orbit between the base frame and two terminal frames. Therefore, the final output torque can be integrated via serial linking and parallel cooperating with the twelve rotating modules.

The "at most two" crank sets is meaningful. It should be emphasized that the quantity of the crank set can be optional, that is zero, one, or two. There are six embodiments for sufficiently introducing the twelve axes mechanism with single crank set or with double crank sets or without crank set. And two independent claims are enumerated, i.e., claim 1 and claim 6. Except excluding crank sets, claim 6 substantially includes a base frame, two terminal frame sets, and four arc-link sets, and the definitions of these elements are as same as those of claim 1.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

FIG. 7A-FIG. 7B show geometrical and perspective drawings of the orbit specification III.

DETAILED DESCRIPTION OF THE INVENTION

The invention is a mechanism which can be manipulated for spherical coordinate kinematics and geometrically constituted by twelve axes. The mechanism comprises a base frame set, two terminal frame sets, four arc-link sets, and at most two crank sets.

The base frame set comprises a base frame 0c including a plurality of brackets and four base rotating module 0a installed into the base frame 0c, the base frame 0c is configured with four vertexes which can be used to constitute a base geometrical tetrahedron, each axis of base rotating module 0a, denoted by unit vector $U_i$, wherein i=1-4, is individually coincided with a vertex-to-center line of the base geometrical tetrahedron, and these four vertex-to-center lines are coincided with the center of the base frame 0a. An angle between any two vertex-to-center lines of the base geometrical tetrahedron is geometrically represented as $\Lambda_{ij}=\mathrm{ArcCos}(U_i \cdot U_j)$, wherein i≠j. The angle between any two vertex-to-center lines of the base geometrical tetrahedron is greater than 75° and less than 150°, i.e.: $75° < \Lambda_{ij} < 150°$. The geometric definition of base frame set is shown as FIG. 1A, FIG. 2A, FIG. 3A, and FIG. 4A.

According to our first pre-invention, if the base frame 0c is geometrically defined as a regular tetrahedron, the regular tetrahedron frame may be easily designed and simulated due to its simple and symmetry. Thus, six angles defined by each pair of vertex-to-center lines of the base frame 0c are equal, approximately 109.5°, i.e.: $\Lambda_{12}=\Lambda_{13}=\Lambda_{14}=\Lambda_{23}=\Lambda_{24}=\Lambda_{34}\approx 109.5°$. But the regular tetrahedron is a configuration most likely to have singularities. This characteristic was clearly introduced and specifically analyzed in our first pre-invention. For the sake of avoiding singularities, it is preferred that the base frame 0c is not defined as a regular tetrahedron.

According to FIG. 12-FIG. 15 referring to our first pre-invention, these four figures and related description are introduced for clearly proving that the operating range of an angle between any two vertex-to-center lines of a movable frame defined by flexible geometric tetrahedron which was ever tested and verified or singularity avoidance can be determined by proper parametric design. Evidently, the mentioned operating range which is proved between 75° and 150° is adapted in the independent claim 1 and claim 6. After analyzing geometrics and configurations, the sufficient and enable mode is disclosed as expected.

Figure 1A:
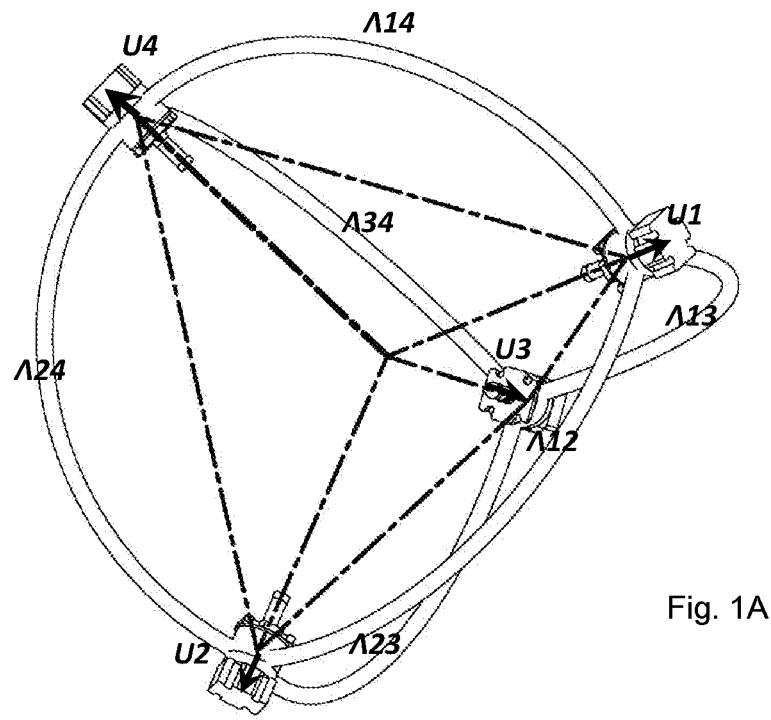
FIG. 1A-FIG. 1B show geometrical and perspective drawings of base frame design type I.
Figure 1B:
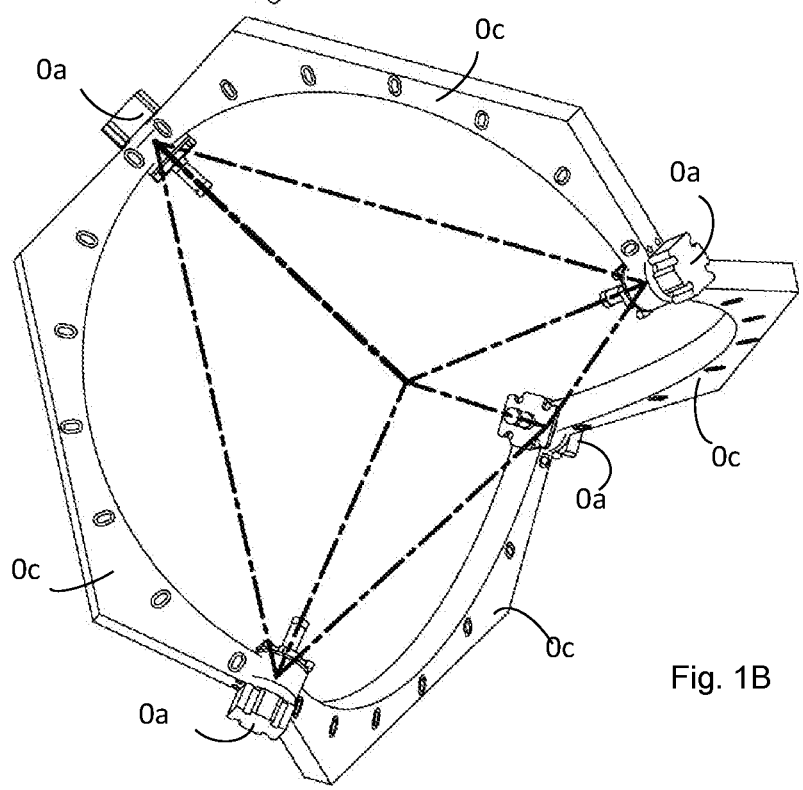
Figure 2A:
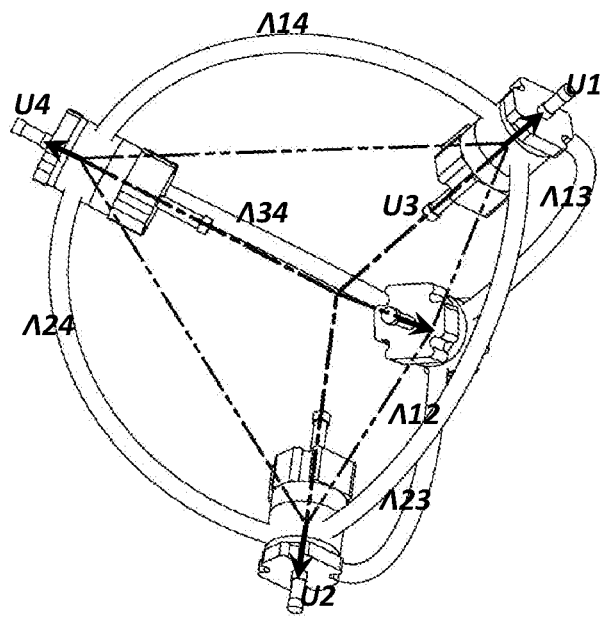
FIG. 2A-FIG. 2B show geometrical and perspective drawings of base frame design type II.
Figure 2B:
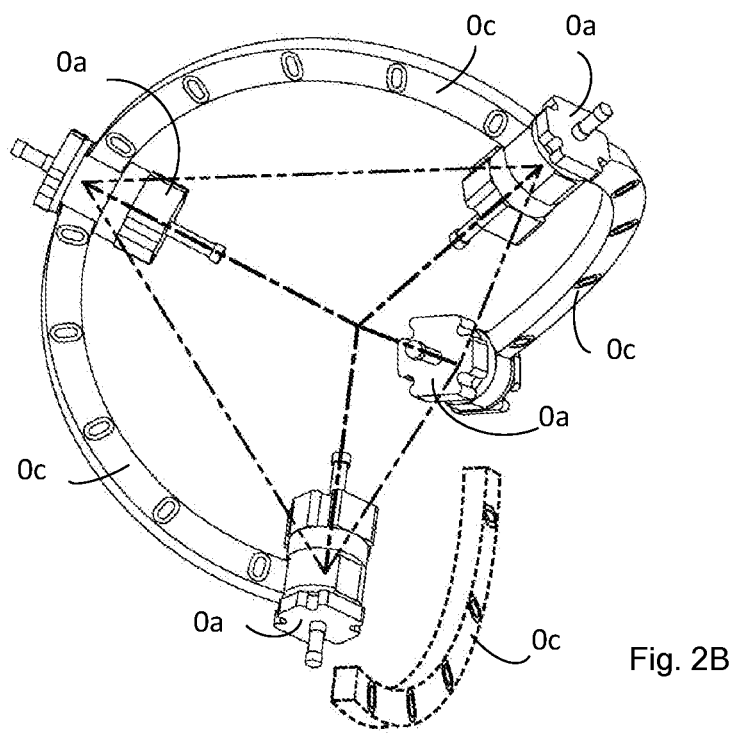
Figure 3A:
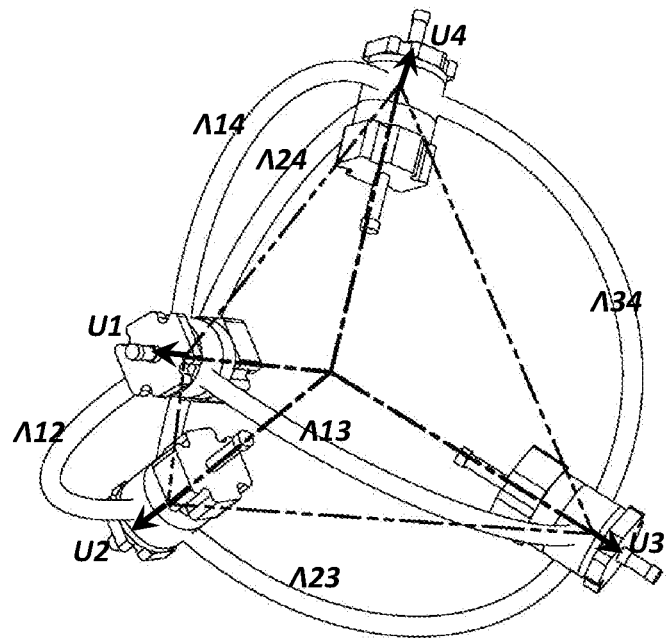
FIG. 3A-FIG. 3B show geometrical and perspective drawings of base frame design type III.
Figure 3B:
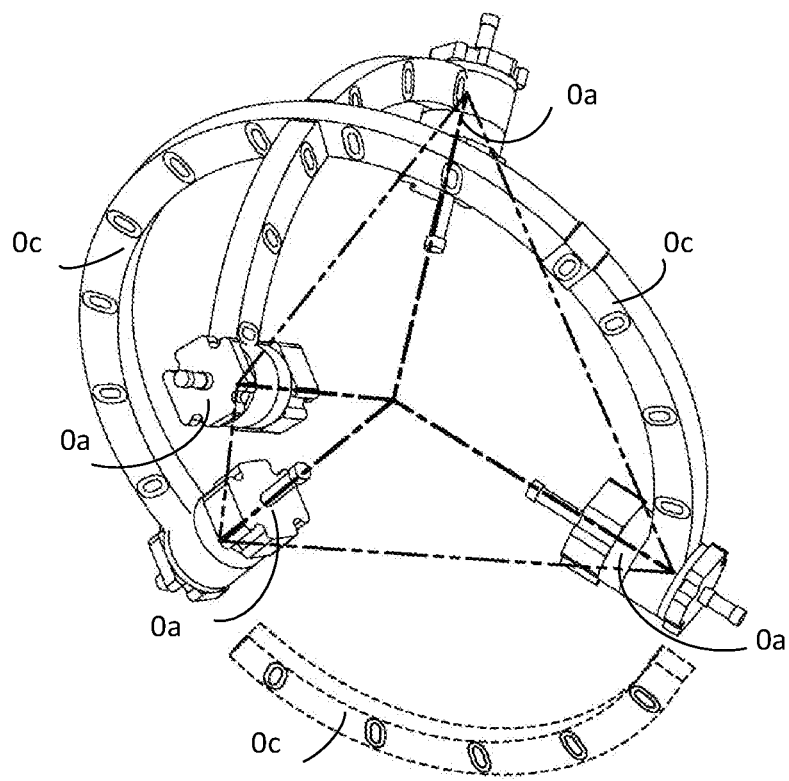
Figure 4A:
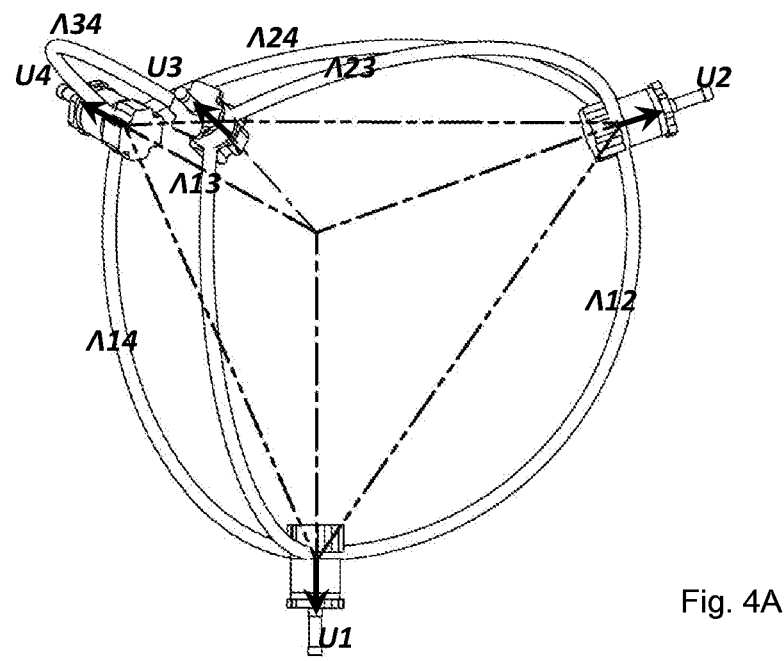
FIG. 4A-FIG. 4B show geometrical and perspective drawings of base frame design type IV.
Figure 4B:
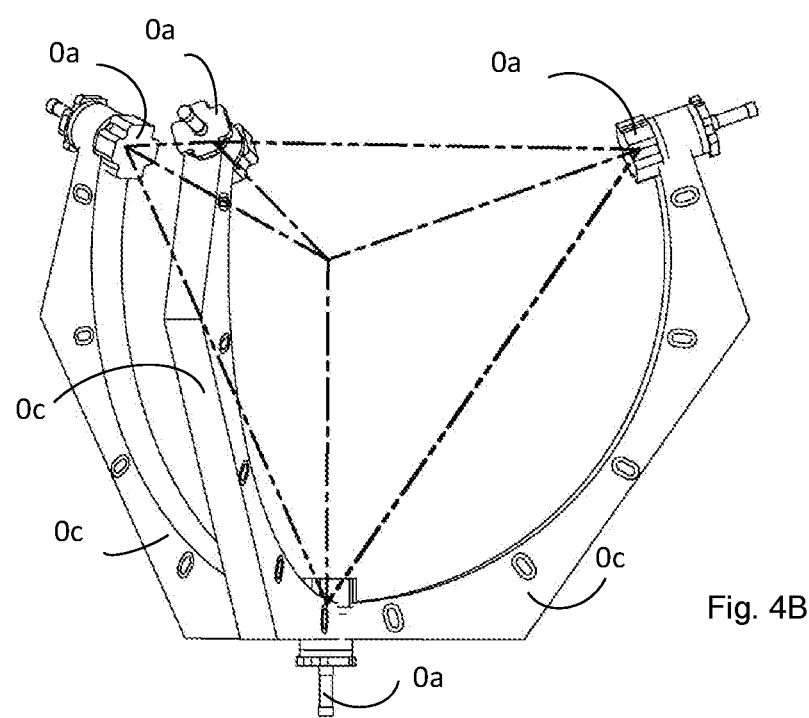

The base frame 0c can be either closed-loop type or open-loop type, and the closed-loop type is designed to enhance rigidity in order to avoid vibration or deformation. The open-loop type is designed for preventing predictable interference caused by arc-link sets. Therefore, there are four design types for base frame 0c, design type I is shown as FIG. 1A-FIG. 1B, design type II is shown as FIG. 2A-FIG. 2B, design type III is shown as FIG. 3A-FIG. 3B, and design type IV is shown as FIG. 4A-FIG. 4B.

In the two terminal frame sets, each terminal frame set comprises an terminal frame 4c and two terminal rotating modules 4a installed into the terminal frame 4c, the terminal frame is geometrically defined by two vertexes which can be used to constitute a terminal geometrical arc, each axis of terminal rotating module 4a is individually coincided with a vertex-to-center line of the terminal geometrical arc, and these two vertex-to-center lines are coincided with the center of the base frame for concentrically rotating the terminal frame along specified geometric orbit. The radius of the terminal frame's geometric orbit is denoted by $r_4$. The radius of the base frame's geometric orbit is denoted by $r_0$.

The two vertex-to-center lines of the first terminal geometrical arc are individually denoted by unit vector $V_1$ and $V_2$. An angle between the two vertex-to-center lines is geometrically represented as $\lambda_{12}=\mathrm{ArcCos}(V_1 \cdot V_2)$. The two vertex-to-center lines of the second terminal geometrical arc are individually denoted by unit vector $V_3$ and $V_4$. An angle between the two vertex-to-center lines is geometrically represented as $\lambda_{34}=\mathrm{ArcCos}(V_3 \cdot V_4)$. The angle between the two vertex-to-center lines of the terminal geometrical arc is greater than 75° and less than 150°, i.e.: $75°<\lambda_{12}<150°$ and $75°<\lambda_{34}<150°$. The geometrical definitions of terminal frame are shown in FIG. 5A, FIG. 6A, FIG. 7A, and FIG. 8A.

In the two terminal frame sets, each terminal frame set further comprises a terminal saddle 4s which can be equipped onto the terminal frame's opposite side relative to terminal arc-links 2c for carrying a payload. The terminal saddle 4s can be functioned as a lifting mechanism having an extendable piston rod as implemented in pneumatic cylinders, hydraulic cylinders or electric actuator. Applications include a robot's shoulder joint and hip joint.

In the four arc-link sets, each arc-link set includes an base arc-link 1c, an terminal arc-link 2c and an arc-link rotating module 2a, an end of the base arc-link 1c is pivotally connected with an end of the terminal arc-link 2c through an axis of arc-link rotating module 2a, the other end of base arc-link 1c is pivotally connected with an axis of base rotating module 0a, and the other end of terminal arc-link 2c is pivotally connected with an axis of terminal rotating module 4a, each axis of arc-link rotating modules 2a, denoted by unit vector $W_i$, wherein i=1-4, is normally directed into the center of the base frame 0c for concentrically rotating each arc-link set along specified geometric orbit between the base frame 0c and two terminal frames 4c. The radius of each base arc-link's geometric orbit is denoted by $r_1$. The radius of each terminal arc-link's geometric orbit is denoted by $r_2$.

Arc-length of a base arc-link 1c, geometrically represented by $\alpha_i=\mathrm{ArcCos}(U_i \cdot W_i)$, is defined as an angle between two axes of the base rotating module 0a and the arc-link rotating module 2a which are individually connected with the same base arc-link 1c. Arc-length of a terminal arc-link 2c, geometrically represented by $\beta_i=\mathrm{ArcCos}(V_i \cdot W_i)$, is defined as an angle between two axes of terminal rotating module 4a and the arc-link rotating module 2a which are individually connected with the same terminal arc-link 2c.

Referring to our first pre-invention, singularities avoidance and geometric limitation were clearly introduced and specifically analyzed. Sum of arc-lengths of any two of the base arc-links is greater than or equal to an angle between their corresponding vertex-to-center lines of the base geometrical tetrahedron, i.e.: $\Lambda_{ij} \leq \alpha_i + \alpha_j$, wherein i≠j. Sum of arc-lengths of any two of the terminal arc-links is greater than or equal to an angle between their corresponding vertex-to-center lines of the same terminal geometrical arc, i.e.: $\lambda_{12} \leq \beta_1+\beta_2$ and $\lambda_{34} \leq \beta_3+\beta_4$.

There are total twelve axes in these four arc-link sets for pivoting with four base rotating modules 0a, four arc-link rotating modules 2a and four terminal rotating modules 4a individually, therefore the final output torque can be integrated via serial linking and parallel cooperating with the twelve rotating modules. The invention is inherited the same twelve axes geometric configuration from our two pre-inventions. An important issue is how to make a twelve axes mechanism operate smoothly without mutual interference and/or singularity while contemplating practical design and regulating geometric limitation. Therefore, the invention is directed to a new approach regarding to interference and singularity avoidance in comparing to our first pre-invention.

The most unbeatable problem is four-axle fold singularity for constructing a mechanism with twelve axes. The phenomena of four-axle fold singularity are detail introduced and precisely defined on FIG. 16-FIG. 21 referring to our first pre-invention. These six figures are clearly expressed for concerning that "Since four-axle fold singularity always happens when the mechanism is at the notional center, once the mechanism is trapped, it is difficult to escape. Unfortunately, the central position must be passed over because it is the vital part for the processes of both initialization and return." In advance, for avoiding four-axle fold singularity, three parameter design approaches are developed by our first pre-invention.

After analyzing the potential challenge related to the singularity, and for providing useful reference for designing, the fourth parameter design approach is introduced. Assign both base arc-link and terminal arc-link belong to the same arc-link set be concentrically rotated along the same geometric orbit, singularity can be avoided for the sake of disability of fully folding, i.e.: the radius of each base arc-link's geometric orbit is "equal to" the radius of each terminal arc-link's geometric orbit. The orbit specification is continually following the two basic orbit specifications described in our second pre-inventions. The first basic orbit specifications, i.e.: the radius of the base frame's geometric orbit is "greater than" the radius of the terminal frame's geometric orbit. The second basic orbit specifications, i.e.: the radius of the base frame's geometric orbit is "less than" the radius of the terminal frame's geometric orbit.

Figure 5A:
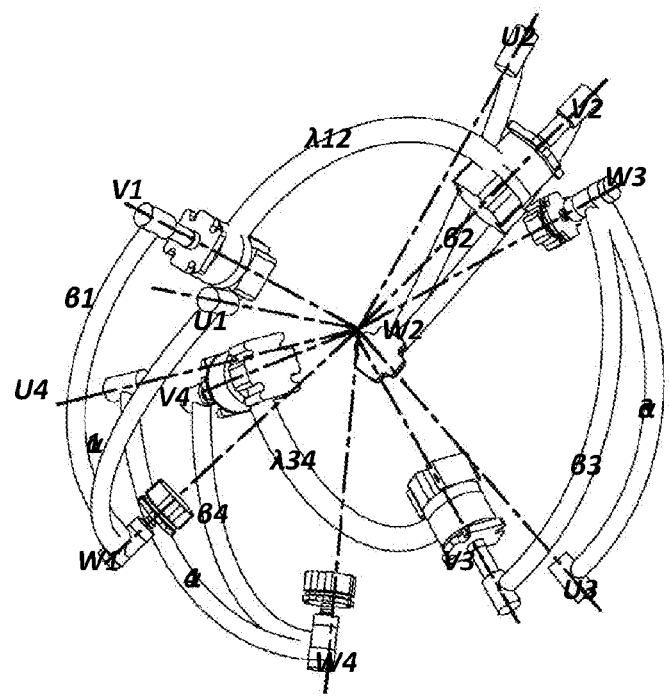
FIG. 5A-FIG. 5B show geometrical and perspective drawings of the orbit specification I.
Figure 5B:
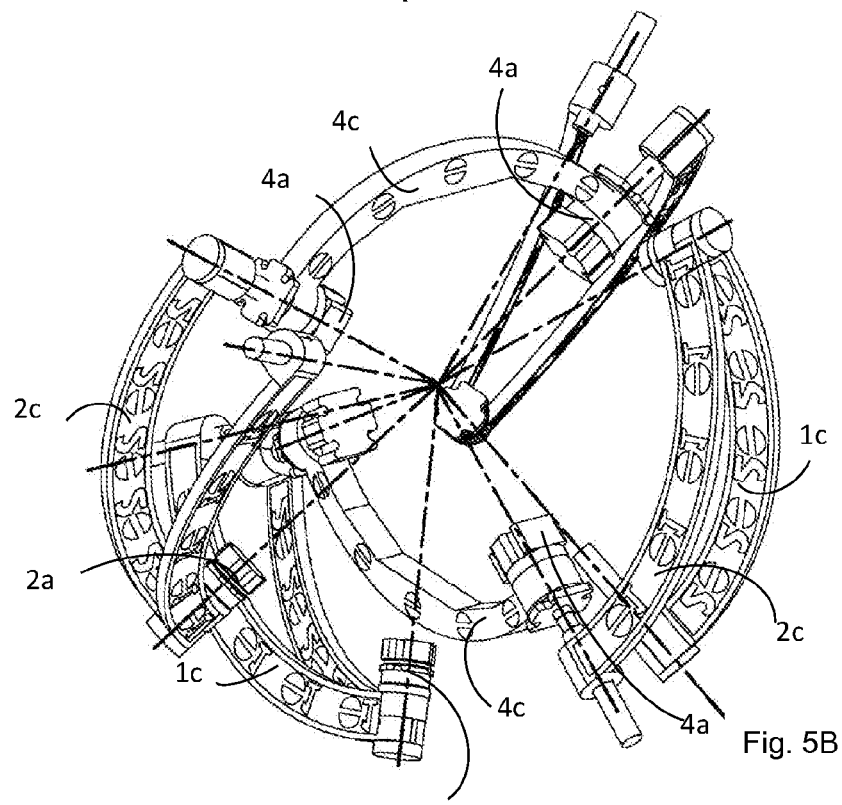
Figure 6A:
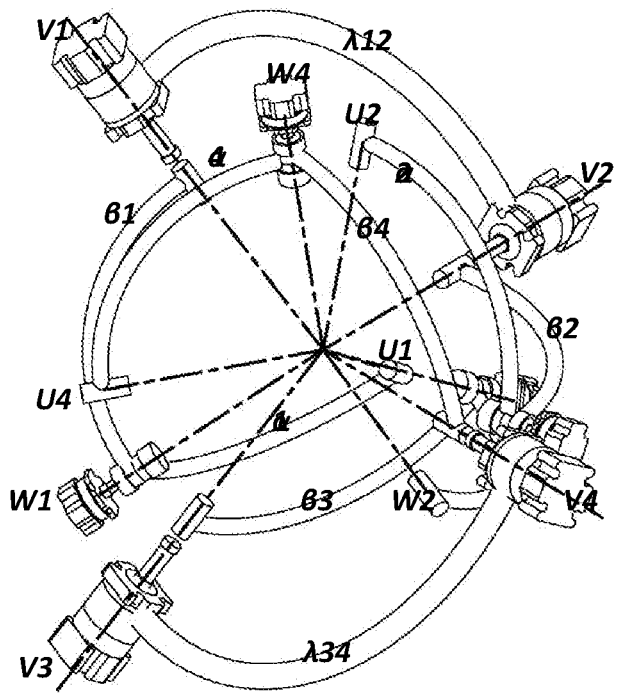
FIG. 6A-FIG. 6B show geometrical and perspective drawings of the orbit specification II.
Figure 6B:
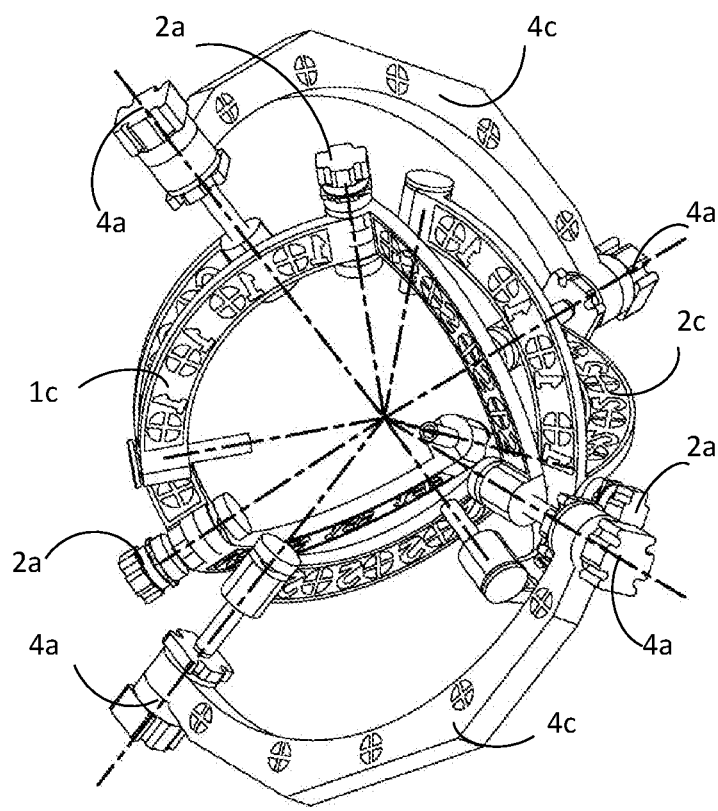
Figure 8A:
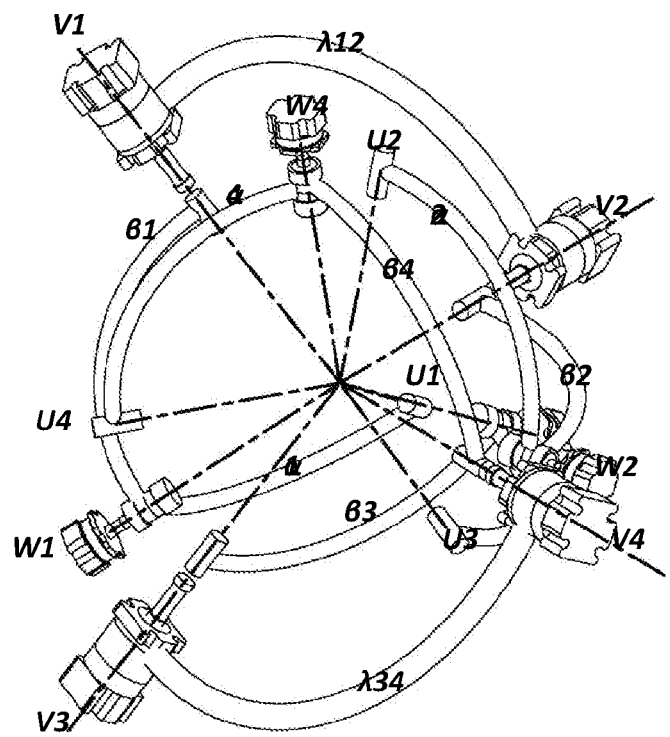
FIG. 8A-FIG. 8B show geometrical and perspective drawings of the orbit specification IV.
Figure 8B:
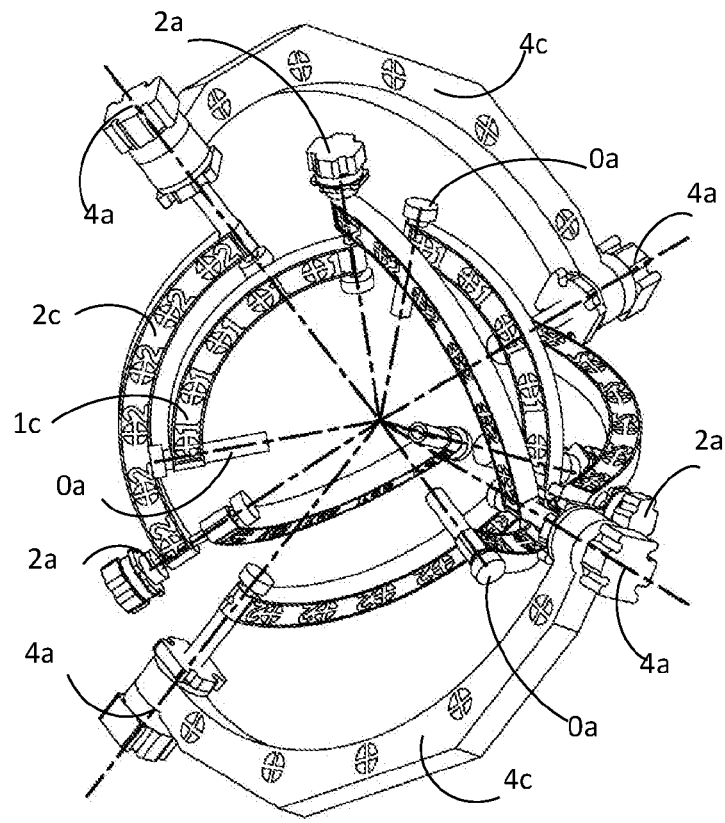
Figure 9A:
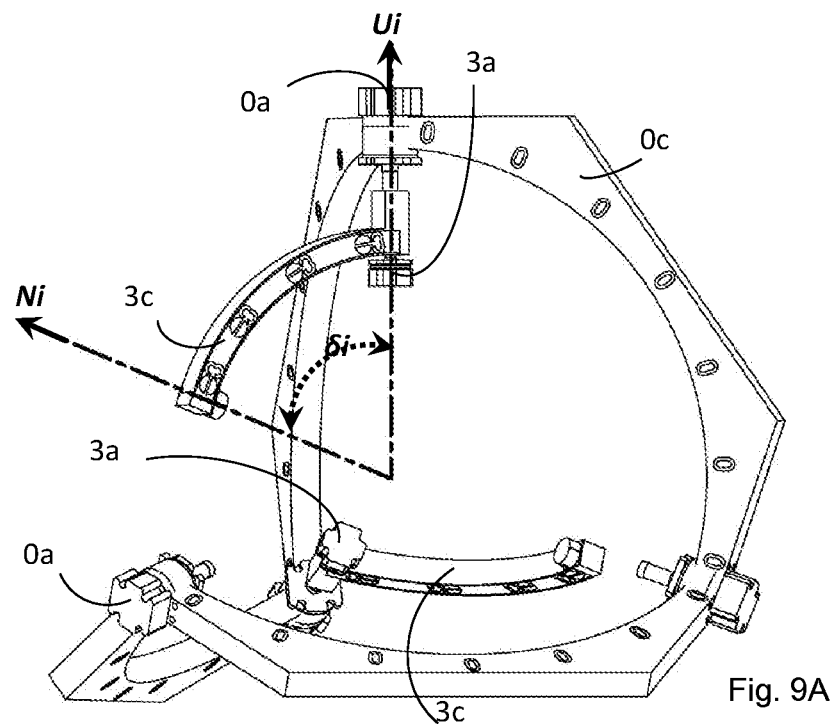
FIG. 9A-FIG. 9B show geometrical and perspective drawings of crank's pivotal configuration I.
Figure 9B:
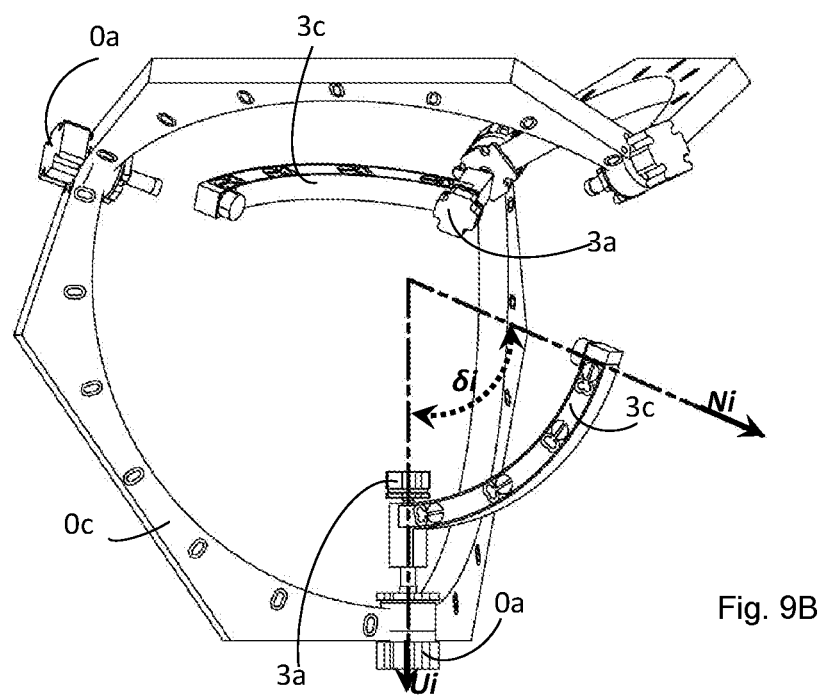
Figure 10A:
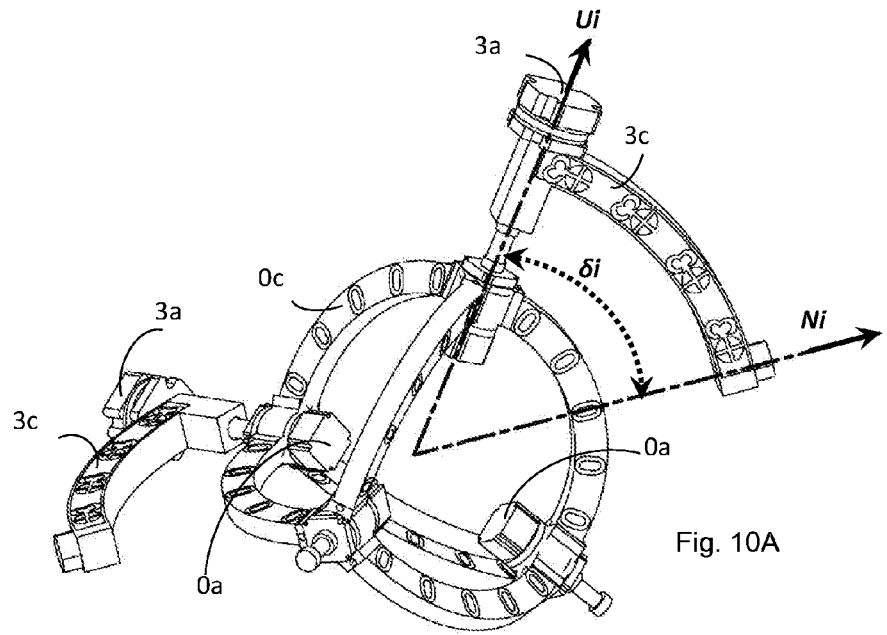
FIG. 10A-FIG. 10B show geometrical and perspective drawings of crank's pivotal configuration II.
Figure 10B:
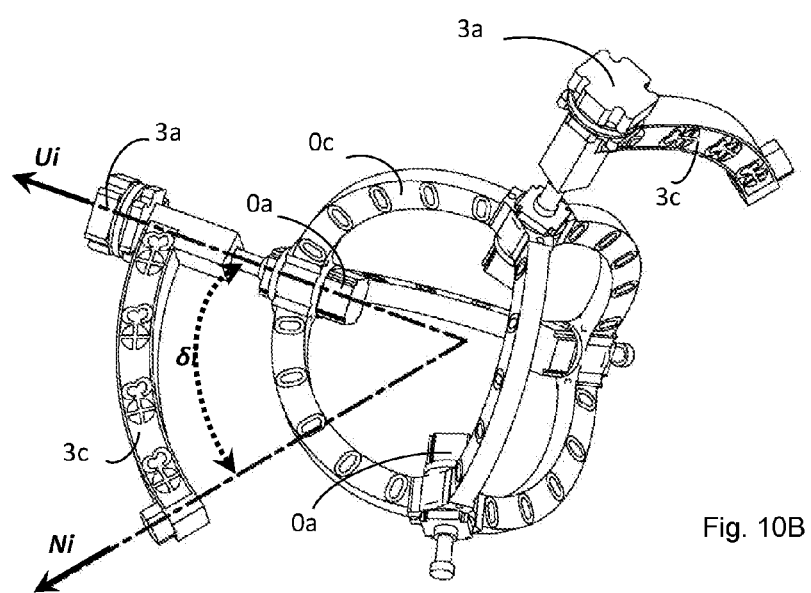

After synthesizing our two pre-inventions and the definition just mentioned above, four orbit specifications are classified for the invention. The orbit specification I: The radius of the base frame's geometric orbit is "greater than" the radius of the terminal frame's geometric orbit, and the radius of each base arc-link's geometric orbit is "equal to" the radius of each terminal arc-link's geometric orbit, i.e.: $r_0 > r_1 = r_2 > r_4$, shown as FIG. 5A-FIG. 5B. The orbit specification II: The radius of the base frame's geometric orbit is "less than" the radius of each terminal frame's geometric orbit, and the radius of each base arc-link's geometric orbit is "equal to" the radius of the terminal arc-link's geometric orbit, i.e.: $r_0 < r_1 = r_2 < r_4$, shown as FIG. 6A-FIG. 6B. The orbit specification III: The radius of the base frame's geometric orbit is "greater than" the radius of the terminal frame's geometric orbit, and the radius of each base arc-link's geometric orbit is "greater than" the radius of each terminal arc-link's geometric orbit, i.e.: $r_0 > r_1 > r_2 > r_4$, shown as FIG. 7A-FIG. 7B. The orbit specification IV: The radius of the base frame's geometric orbit is "less than" the radius of the terminal frame's geometric orbit, and the radius of each base arc-link's geometric orbit is "less than" the radius of each terminal arc-link's geometric orbit, i.e.: $r_0 < r_1 < r_2 < r_4$, shown as FIG. 8A-FIG. 8B.

In the at most two crank sets, each crank set comprises an arc crank $3c$ and a crank rotating module $3a$. An end of the arc crank $3c$ is mounted a rod which is concentrically extended opposite side relative to the base frame $0c$, these extending lines of the extended rods are denoted by unit vector $N_i$, wherein i=1-2. The other end of the arc crank $3c$ is pivoted through an axis of base rotating module $0a$ and installed into the crank rotating module $3a$ opposite side relative to the base frame $0c$, and the arc crank $3c$ can be concentrically rotated along a geometric orbit between terminal arc-link $2c$ and terminal frame $4c$. The radius of each arc crank's geometric orbit is denoted by $r_3$. Arc-length of arc crank $3c$, geometrically represented by $\delta_i = \text{ArcCos}(U_i \cdot N_i)$, wherein i=1-2, is defined as an angle between the axis of base rotating module $0a$ and the extended rod mounted onto the same arc crank $3c$. The arc-length of arc crank $3c$ is less than or equal to 90°, i.e.: $\delta_i \leq 90°$, wherein i=1-2. The geometric definitions of crank set are shown as FIG. 9A-FIG. 9B and FIG. 10A-FIG. 10B.

The crank rotating module $3a$ can be functionally actuated for preventing predictable interference caused by terminal arc-link $2c$ and/or terminal frame $4c$. Each crank set further comprises a crank saddle $3s$ which can be equipped onto the arc crank's extended rod opposite side relative to the base frame $0c$ for carrying the payload. The crank saddle $3s$ can be a clamp of a lathe to support a shaft of a laser cutter or install a drill as applied in multi-shaft composite machining centers.

The end effect arc-link assembly introduced in our second pre-invention is renamed as crank set in the invention, and more especially, "at least one" end effect arc-link assemblies are improved as "at most two" crank sets. If geometrics and configurations are simply concerned, at most four crank sets are able to install in the base frame $0c$. After simulating and verifying, utility and effectiveness of greater than two crank sets are worthless, because they are unavoidably interfered with base frame $0c$ and/or each arc-link set. Work space of two crank sets is also reduced but acceptable, because they can clamp the payload corporately and stably. Work space of one crank set is gradually increased, and oscillation and vibration are easily accompanied for a single crank hanging alone.

While our first pre-invention has a greater space for orientating due to no hinder of any crank set, it is capable of directly outputting torque due to eliminating crank set. Although shortage of crank saddle $3s$, payload still can be carried on equipping terminal saddles $4s$. The different quantity of crank sets are separately adapted in different suitable domains, therefore, the quantity about "at most two" is adapted in the invention to replace by the quantity about "at least one" in our second pre-invention. After analyzing geometrics and configurations, the sufficient and enable mode is disclosed as expected.

The base frame $0c$ can be either closed-loop type or open-loop type, and the closed-loop type is designed to enhance rigidity in order to avoid vibration or deformation. The open-loop type is designed for preventing predictable interference caused by arc-link sets and/or crank sets. Therefore, there are four design types for base frame $0c$, design type I is shown as FIG. 1A-FIG. 1B, design type II is shown as FIG. 2A-FIG. 2B, design type III is shown as FIG. 3A-FIG. 3B, design type IV is shown as FIG. 4A-FIG. 4B.

There are two pivotal configurations for connecting the at most two crank sets and base frame set. The two pivotal configurations are continually following two basic orbit specifications described in our second pre-inventions. The pivotal configuration I: The arc crank $3c$ can be concentrically rotated along a geometric orbit between each terminal arc-link $2c$ and the terminal frames $4c$ while the radius of each terminal arc-link's geometric orbit is "greater than" the radius of the terminal frame's geometric orbit, i.e.: $r_2 > r_3 > r_4$, shown as FIG. 9A-FIG. 9B. The pivotal configuration II: The arc crank $3c$ can be concentrically rotated along a geometric orbit between each terminal arc-link $2c$ and the terminal frames $4c$ while the radius of each terminal arc-link's geometric orbit is "less than" the radius of the terminal frame's geometric orbit, i.e.: $r_2 < r_3 < r_4$, shown as FIG. 10A-FIG. 10B.

The base rotating module $0a$ can be assembled by a torque output device and/or an angle sensor and/or a bearing with an axle. The arc-link rotating module $2a$ can be assembled by a torque output device and/or an angle sensor and/or a bearing with an axle. The terminal rotating module 4a can be assembled by a torque output device and/or an angle sensor and/or a bearing with an axle. The crank rotating module 3a can be assembled by a torque output device and/or an angle sensor and/or a bearing with an axle.

Figure 11A:
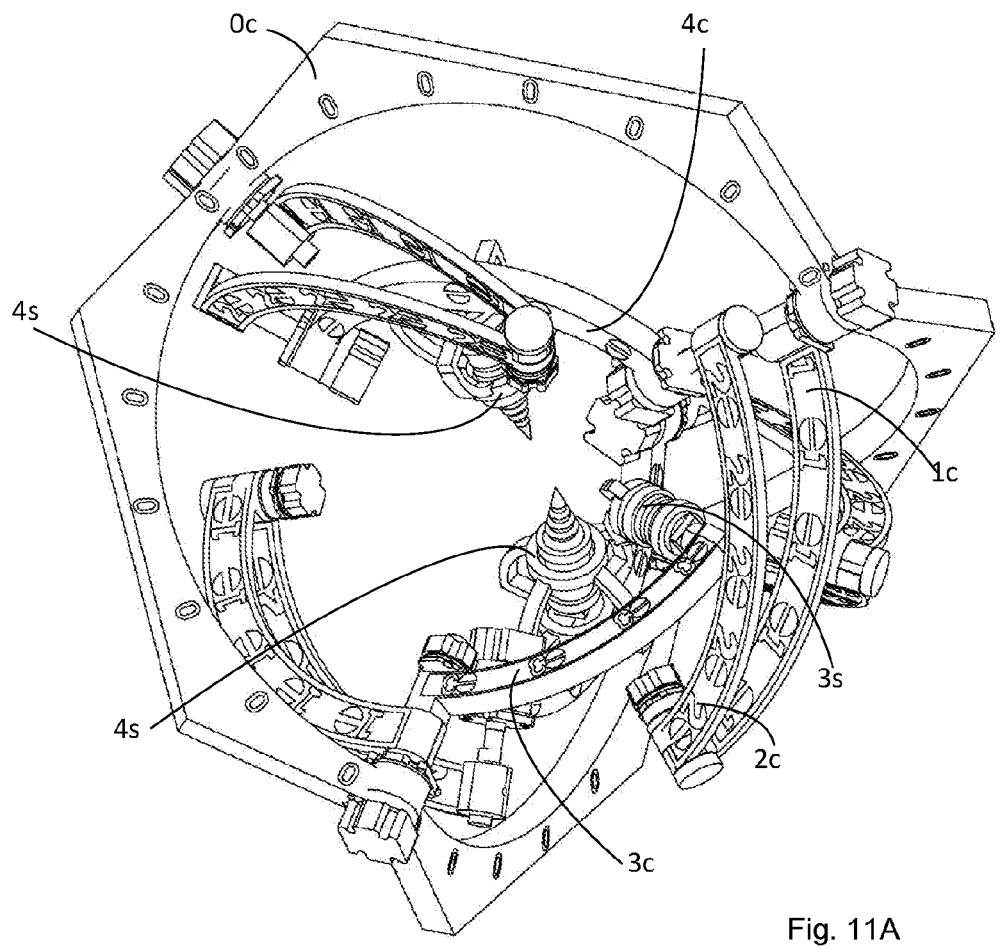
FIG. 11A-FIG. 11C show the first embodiment's 3-view drawings for the orbit specification I with single crank set.
Figure 11B:
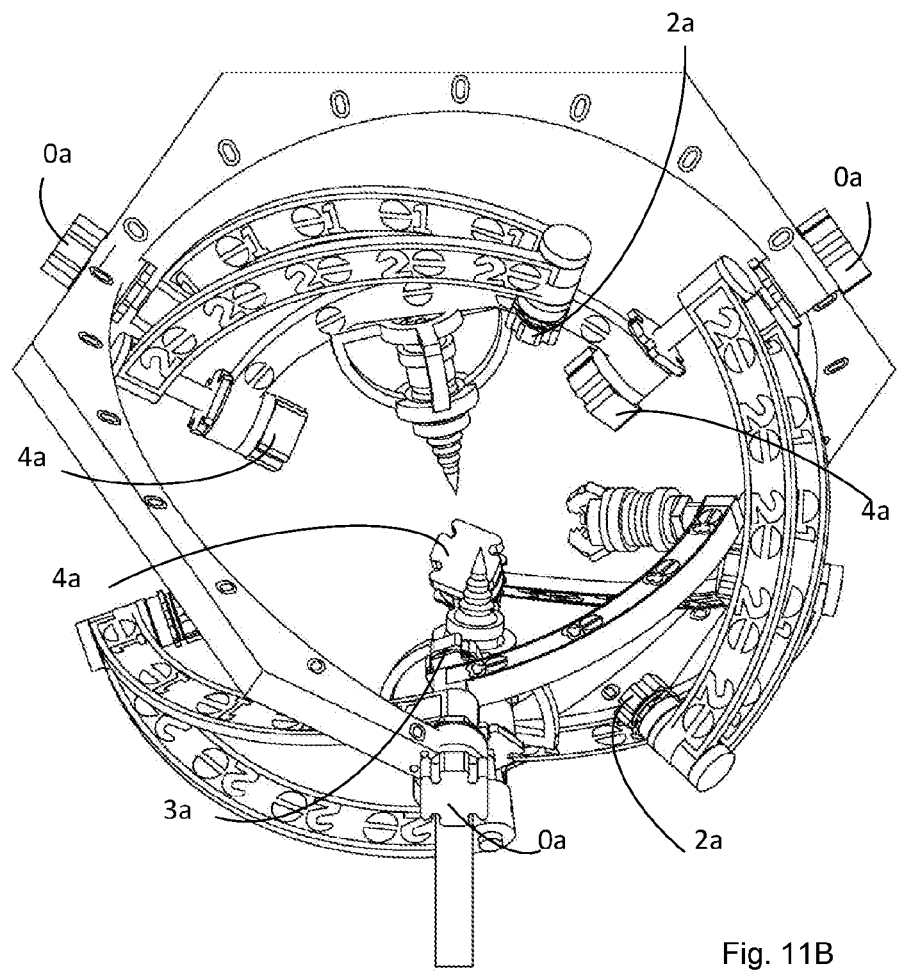
Figure 11C:
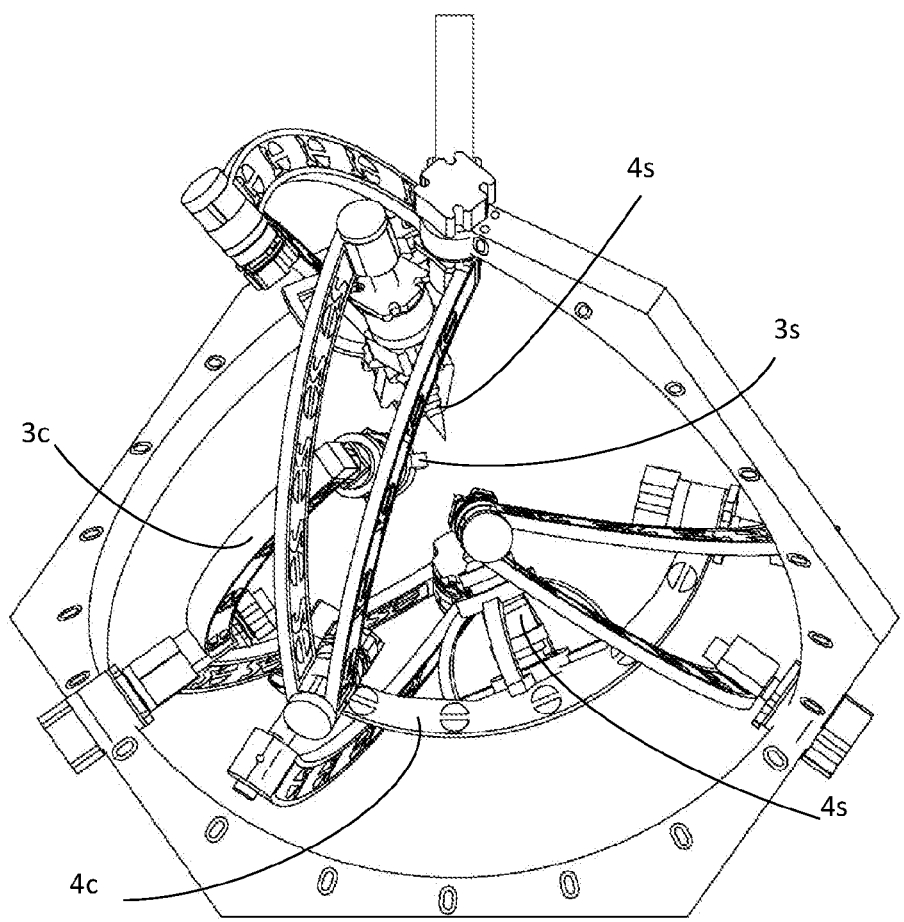
Figure 12A:
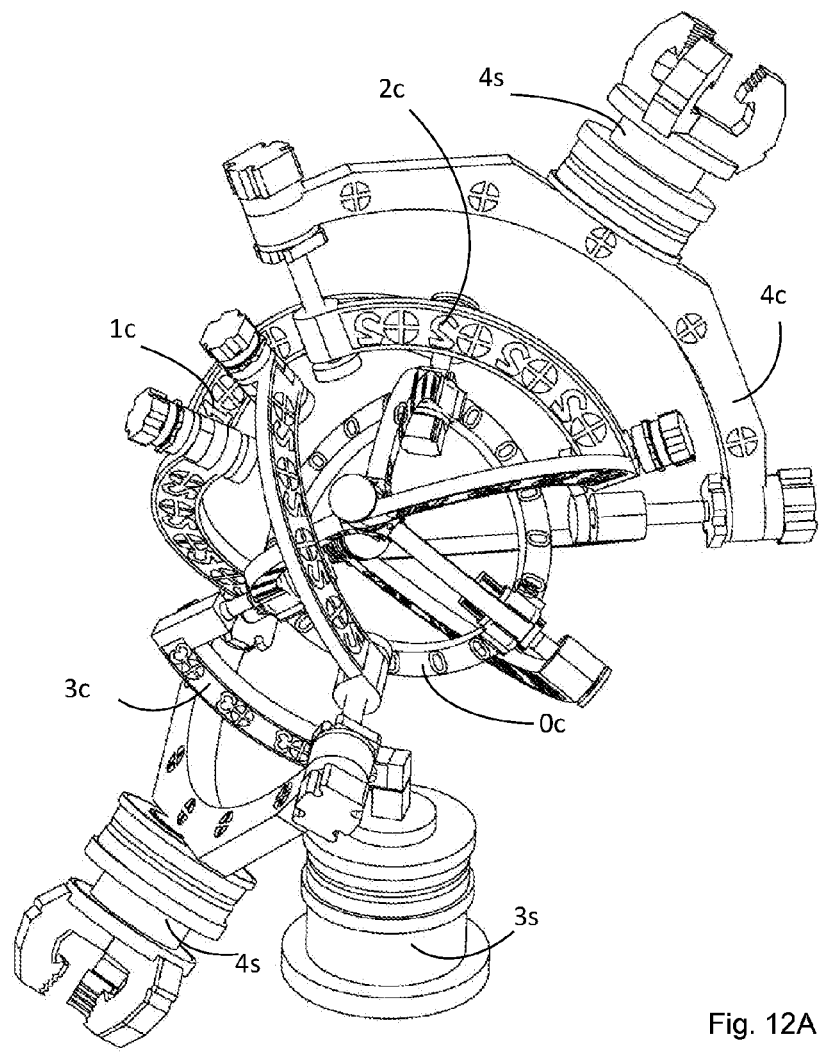
FIG. 12A-FIG. 12C show the second embodiment's 3-view drawings for the orbit specification II with single crank set.
Figure 12B:
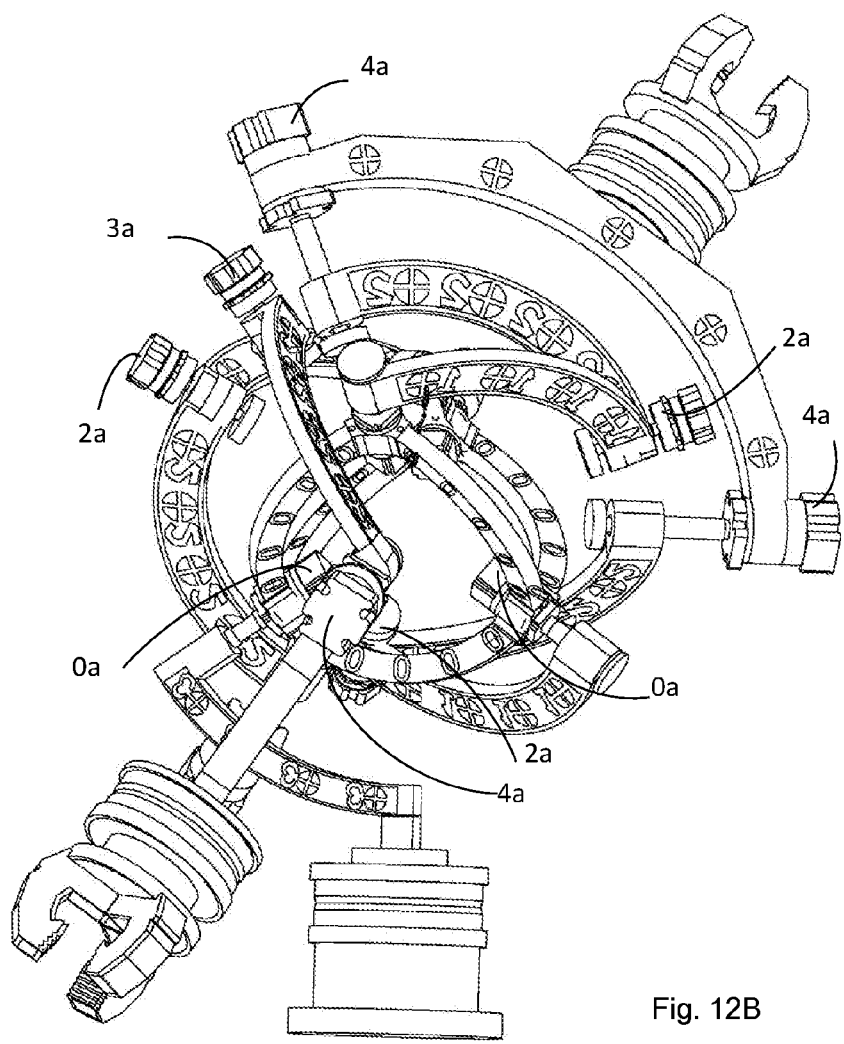
Figure 12C:
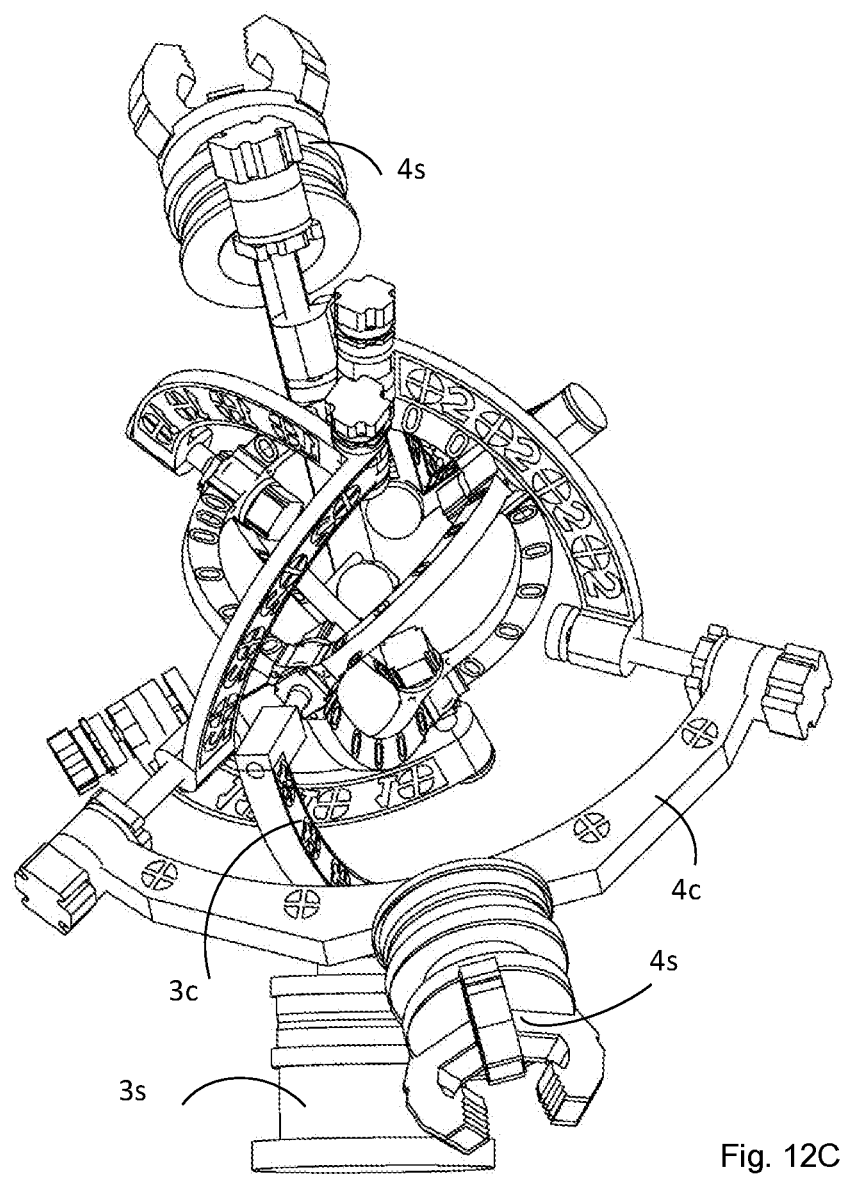
Figure 13A:
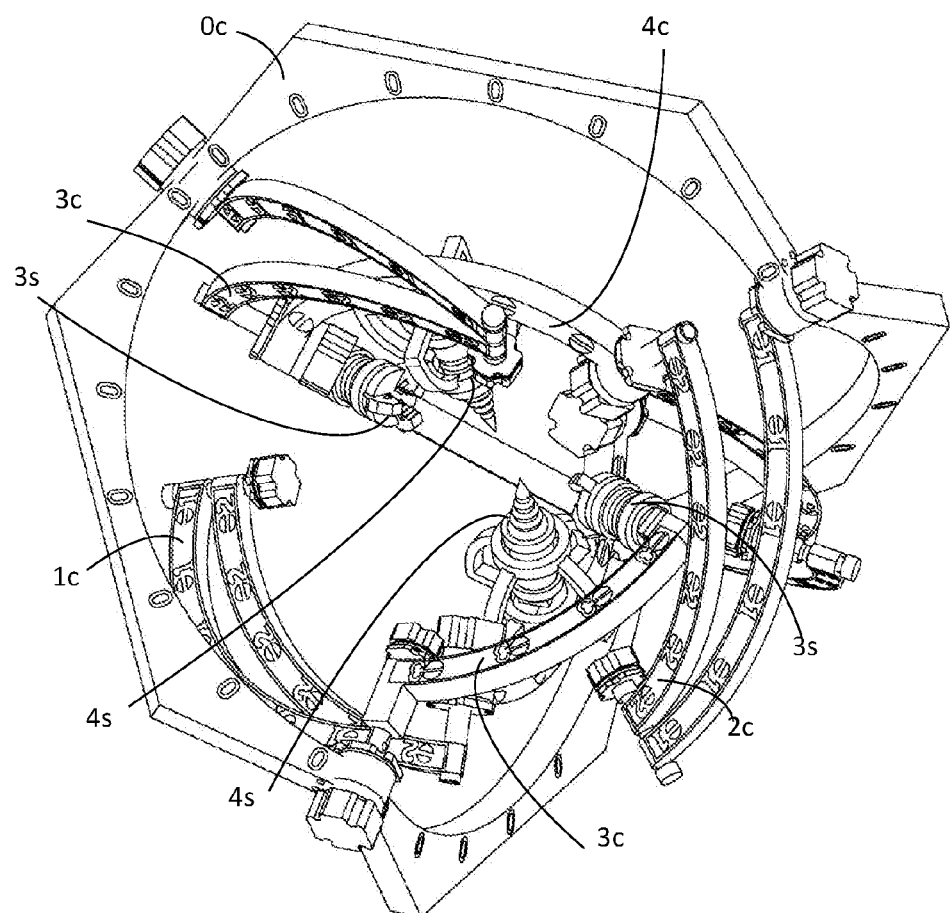
FIG. 13A-FIG. 13C show the third embodiment's 3-view drawings for the orbit specification III with double crank sets.
Figure 13B:
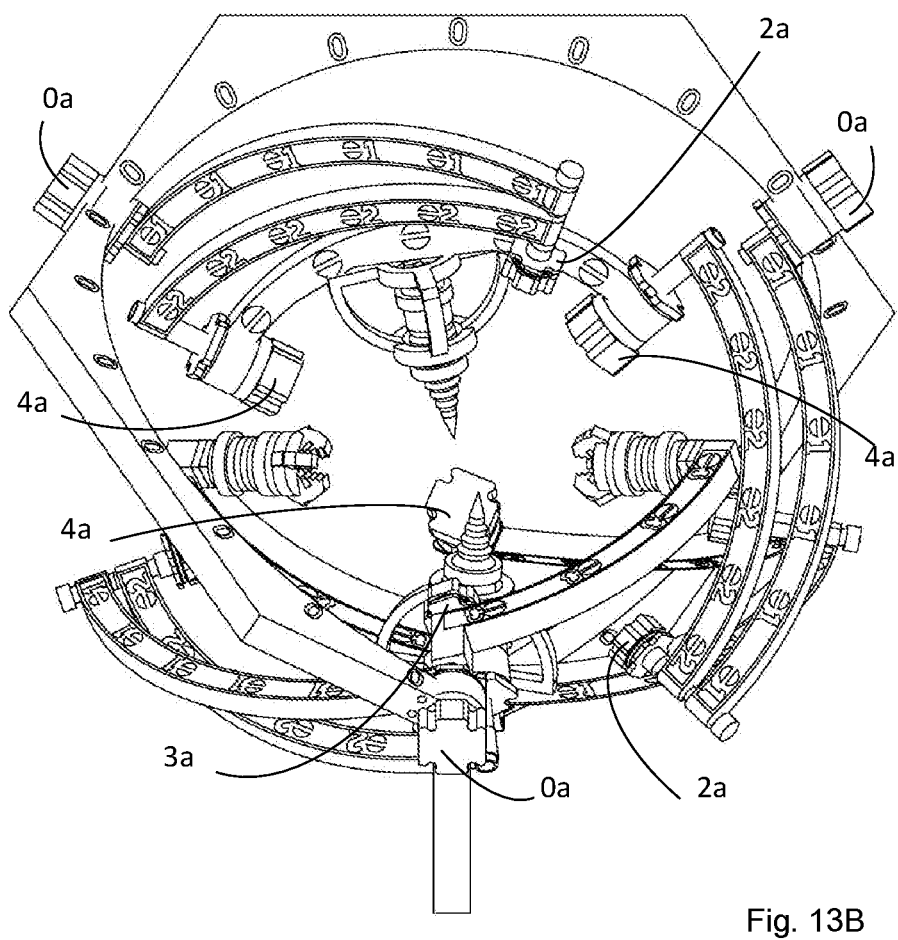
Figure 13C:
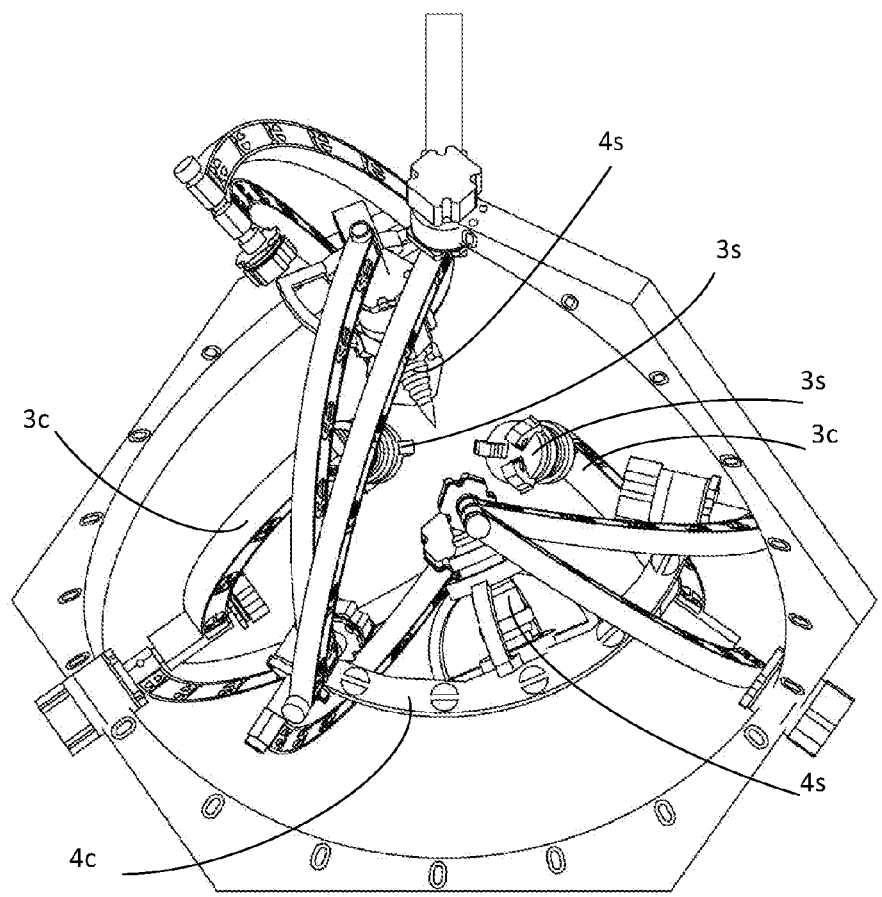
Figure 14A:
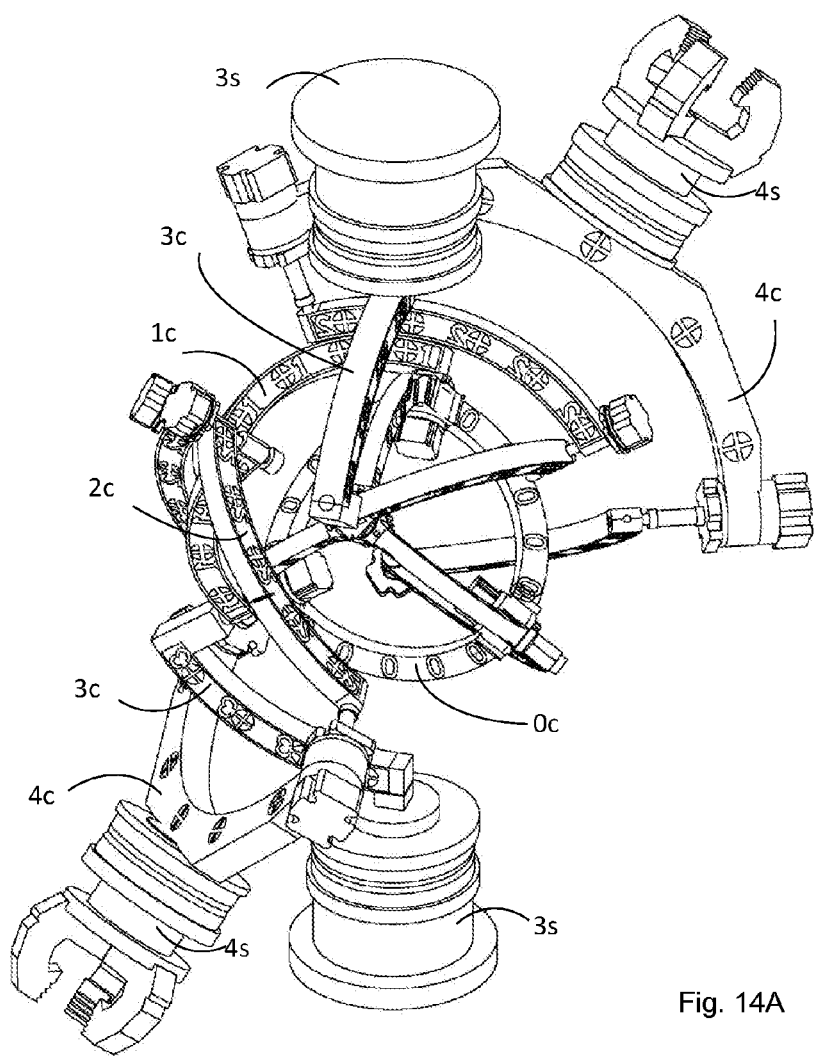
FIG. 14A-FIG. 14C show the fourth embodiment's 3-view drawings for the orbit specification IV with double crank sets.
Figure 14B:
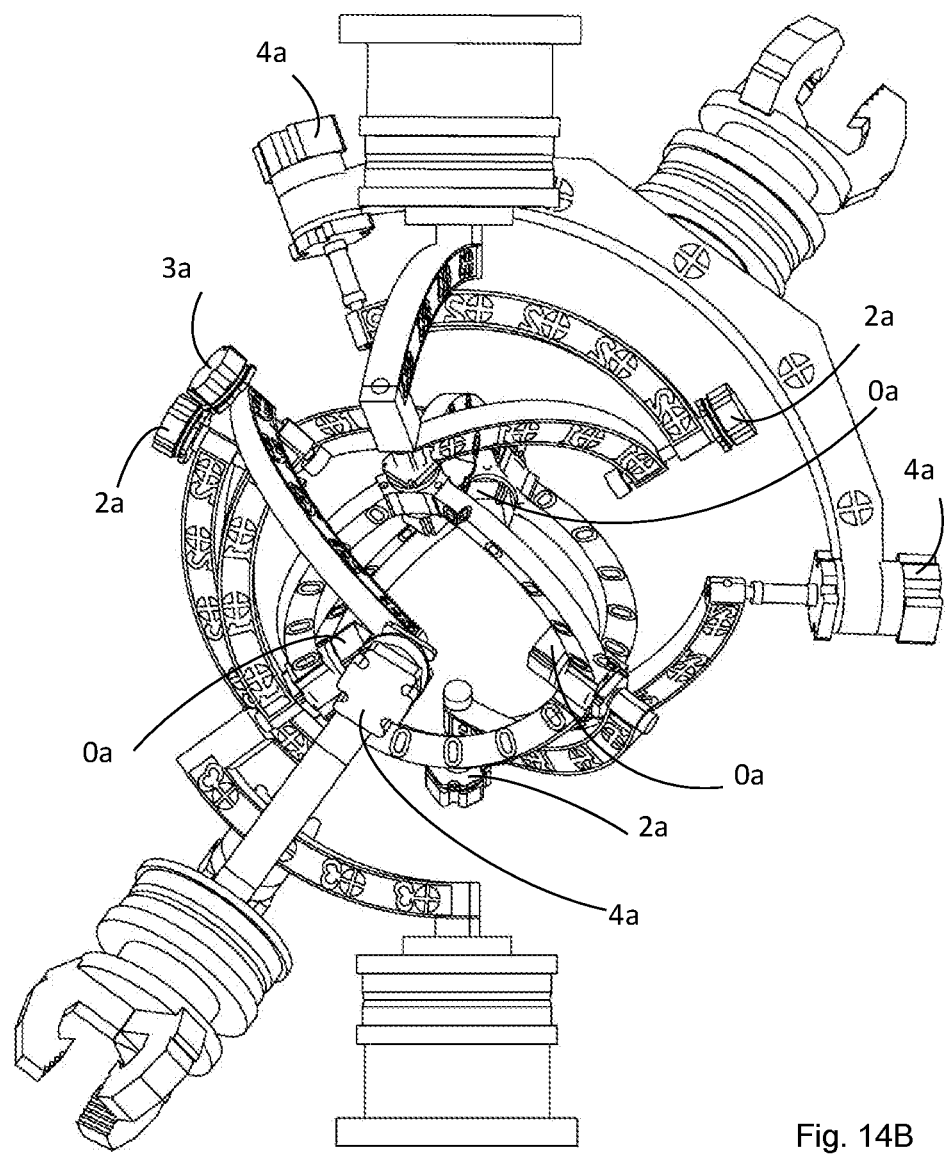
Figure 14C:
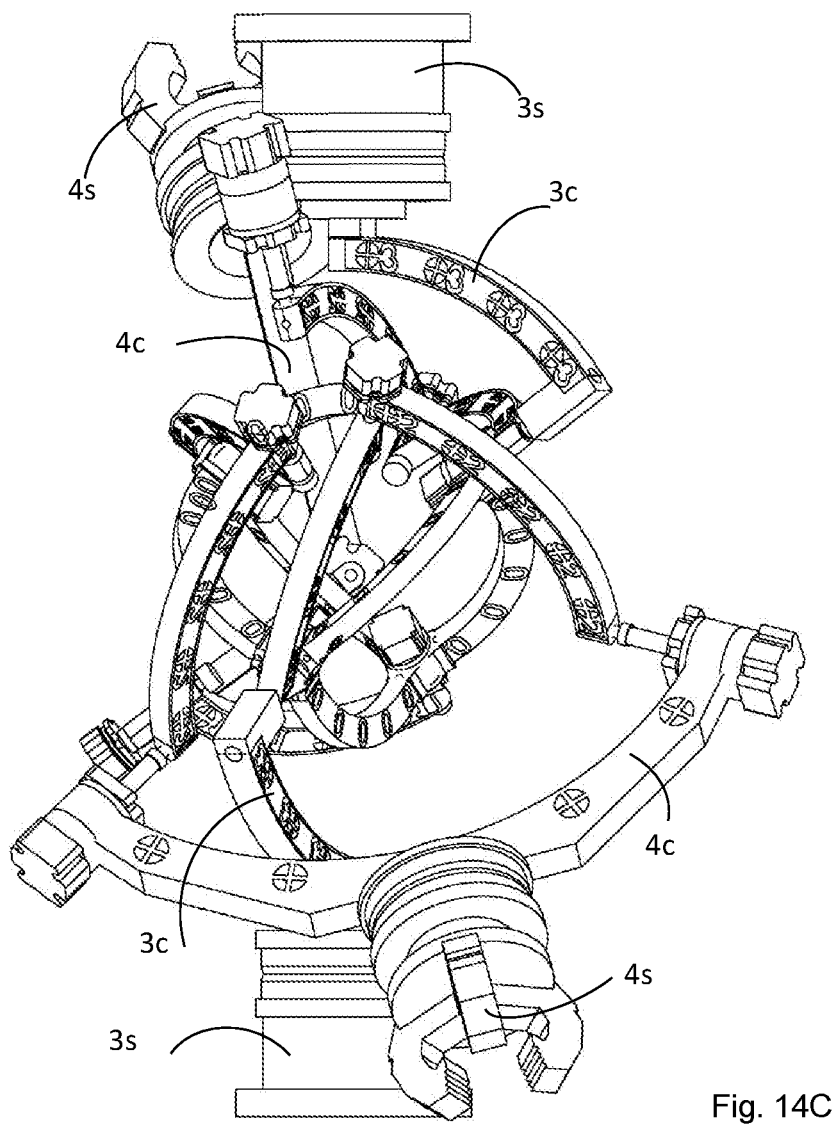
Figure 15A:
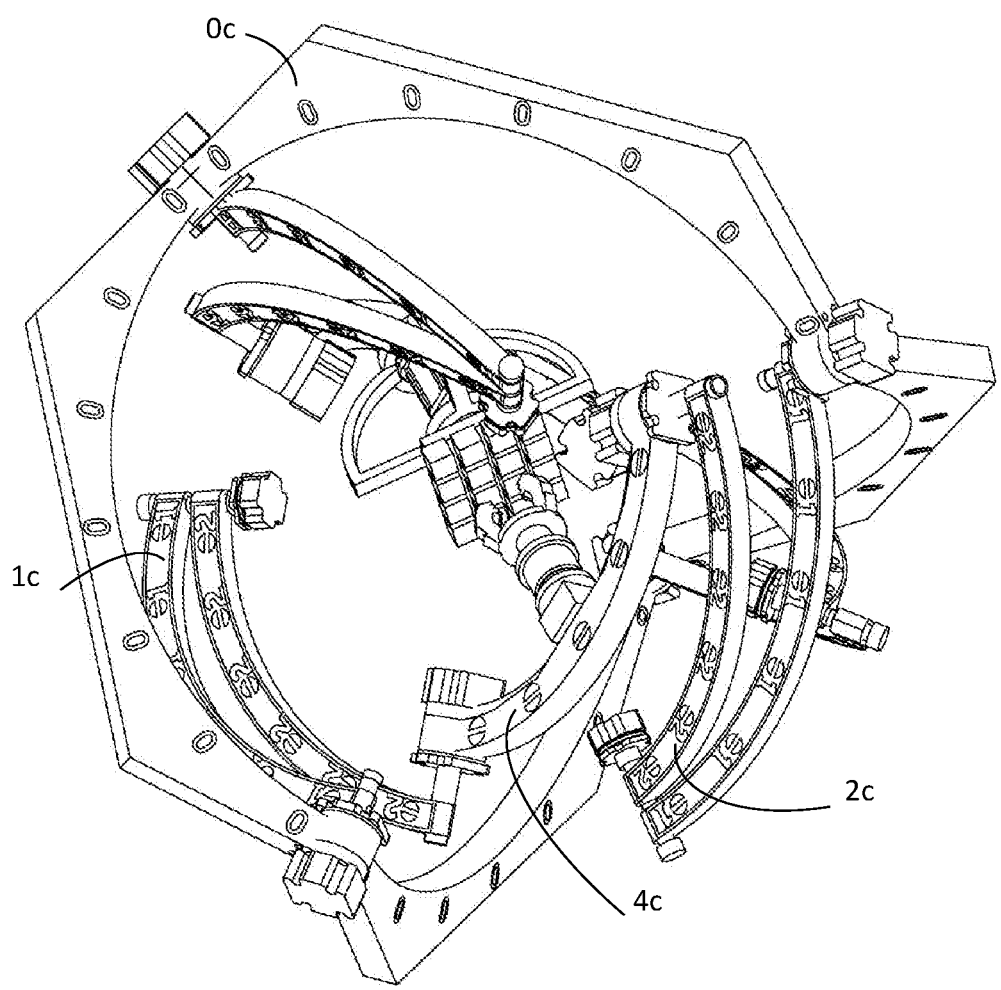
FIG. 15A-FIG. 15C shows the fifth embodiment's 3-view drawings for the orbit specification III without crank set.
Figure 15B:
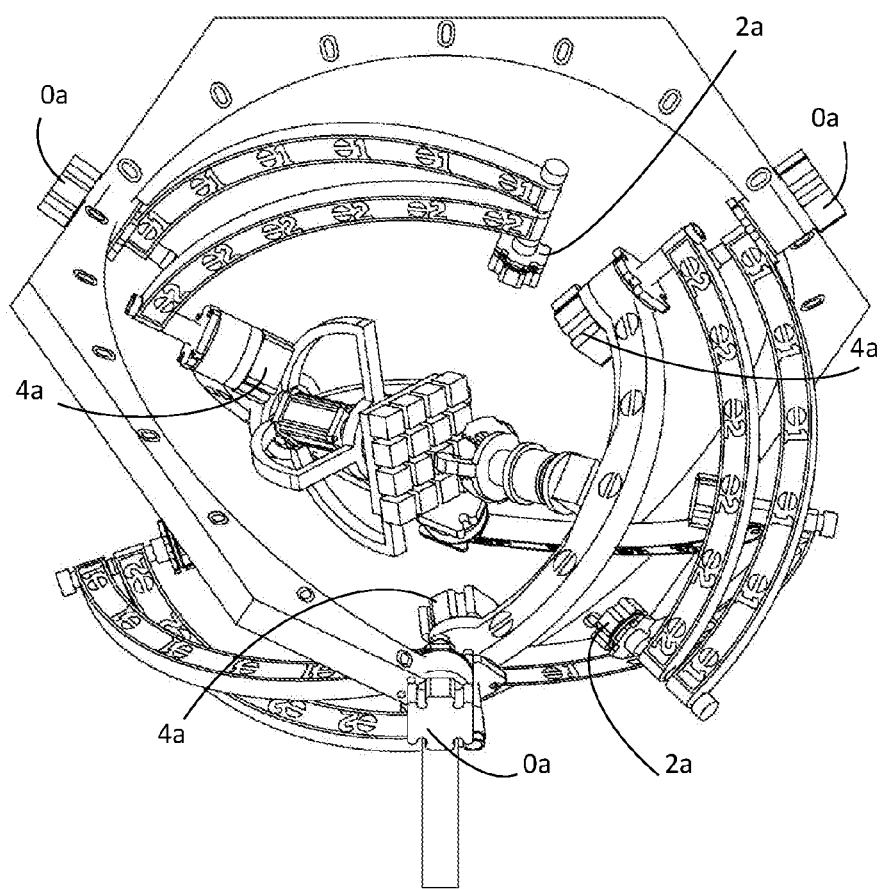
Figure 15C:
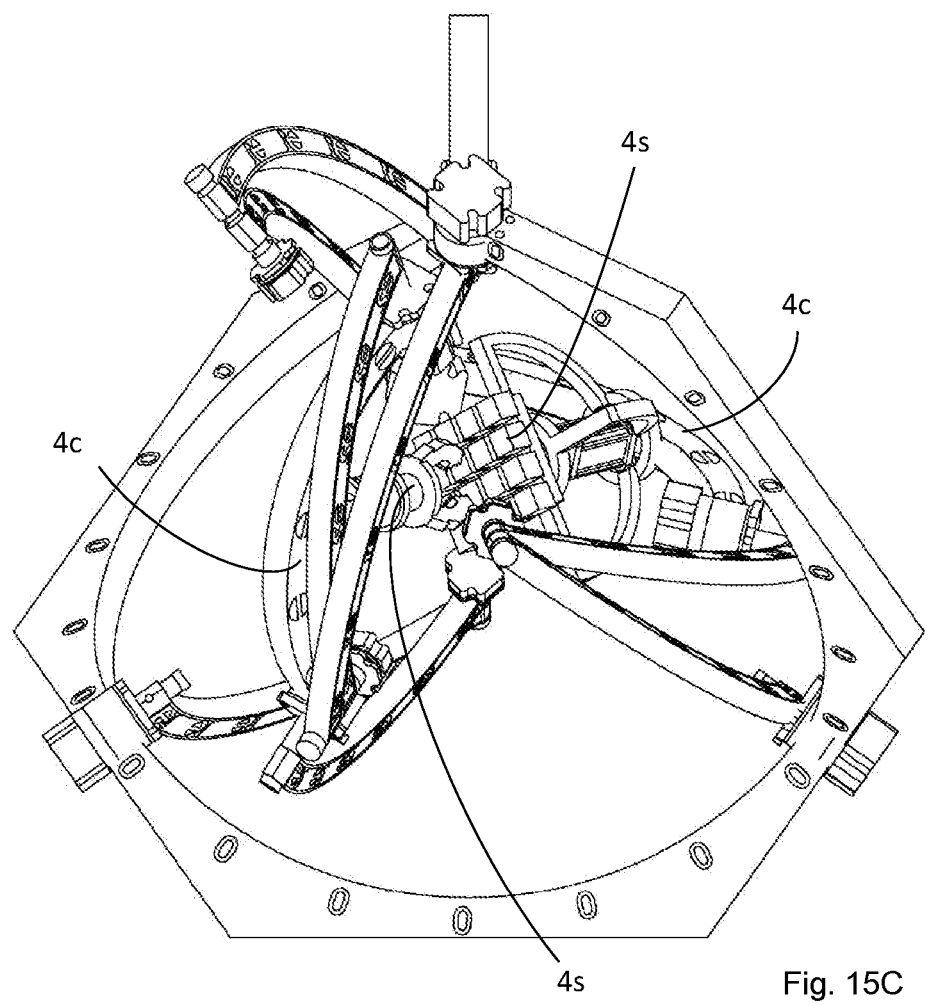
Figure 16A:
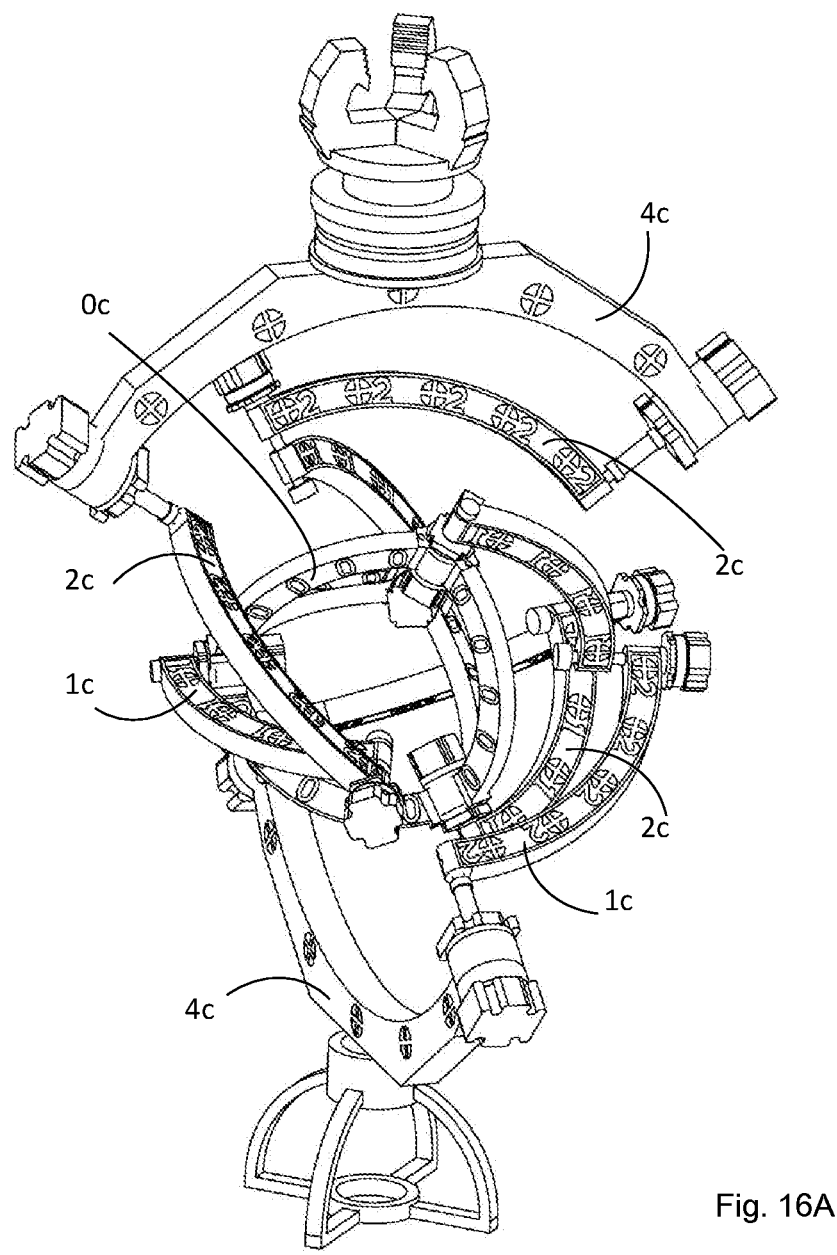
FIG. 16A-FIG. 16C shows the sixth embodiment's 3-view drawings for the orbit specification IV without crank set.
Figure 16B:
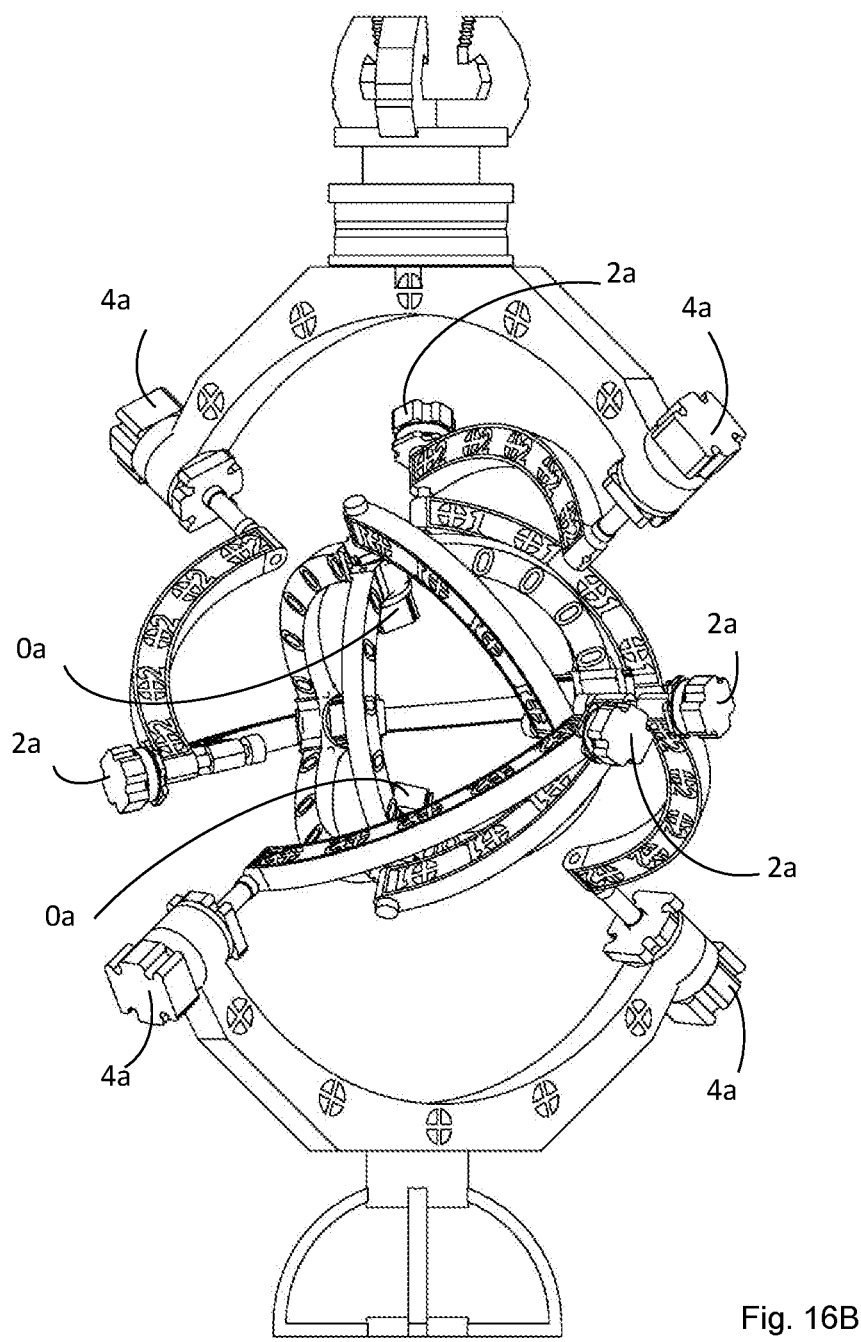
Figure 16C:
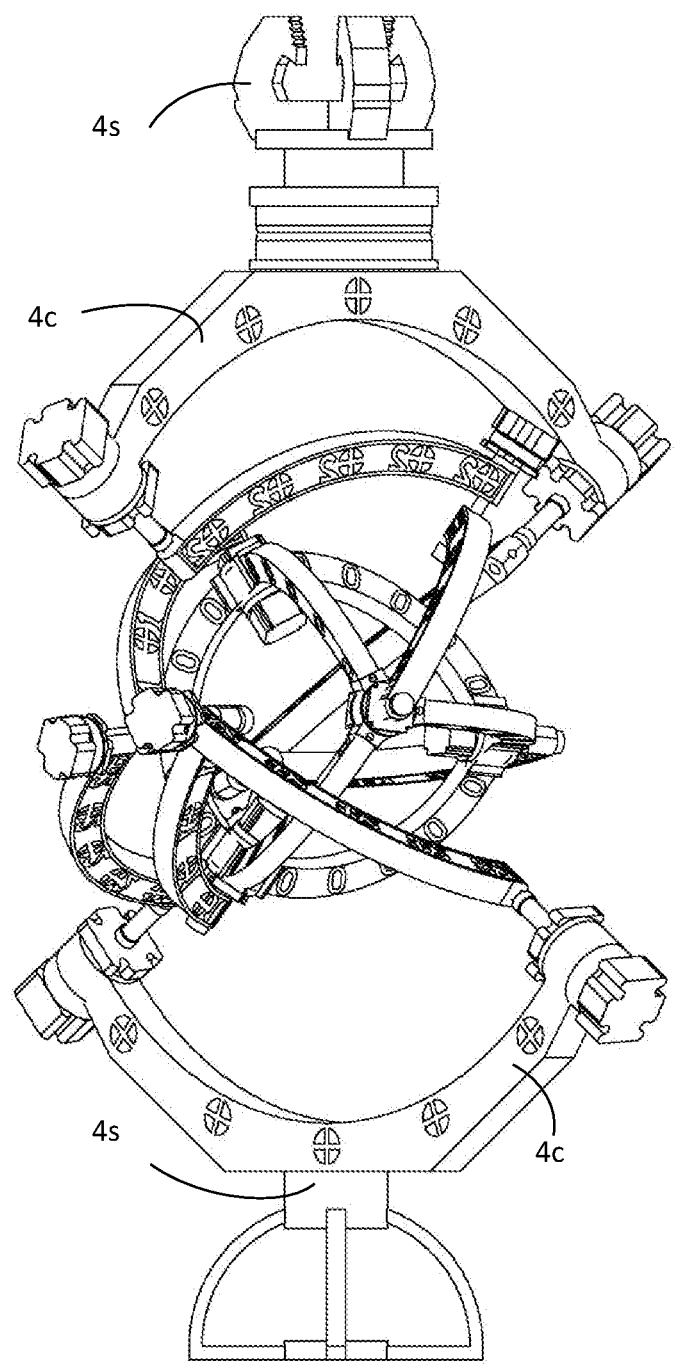

There are six embodiments for realizing the invention. The first embodiment is the orbit specification I with single crank set, shown as FIG. 11A-FIG. 11C. The second embodiment is the orbit specification II with single crank set, shown as FIG. 12A-FIG. 12C. The third embodiment is the orbit specification III with double crank sets, shown as FIG. 13A-FIG. 13C. The fourth embodiment is the orbit specification IV with double crank sets, shown as FIG. 14A-FIG. 14C. The fifth embodiment is the orbit specification III without crank set, shown as FIG. 15A-FIG. 15C. The sixth embodiment is the orbit specification IV without crank set, shown as FIG. 16A-FIG. 16C.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mechanism geometrically constituted with twelve axes configured to be manipulated for spherical coordinate kinematics, comprising:
    a base frame set comprising a base frame including a plurality of brackets and four base rotating modules installed into the base frame, the base frame being configured with four vertexes which can be used to constitute a base geometrical tetrahedron, each axis of the base rotating module being individually coincided with a vertex-to-center line of the base geometrical tetrahedron, and these four vertex-to-center lines being coincided with the center of the base frame, wherein an angle between any two vertex-to-center lines of the base geometrical tetrahedron is greater than 75° and less than 150°;
    two terminal frame sets, each terminal frame set comprising a terminal frame and two terminal rotating modules installed into the terminal frame, the terminal frame being geometrically defined by two vertexes which can be used to constitute a terminal geometrical arc, each axis of terminal rotating module being individually coincided with a vertex-to-center line of the terminal geometrical arc, and these two vertex-to-center lines being coincided with the center of the base frame for concentrically rotating the terminal frame along a specified geometric orbit, wherein the angle between the two vertex-to-center lines of the terminal geometrical arc is greater than 75° and less than 150°;
    four arc-link sets, each arc-link set comprising a base arc-link, a terminal arc-link and an arc-link rotating module, an end of the base arc-link being pivotally connected with an end of the terminal arc-link through an axis of arc-link rotating module, other end of the base arc-link being pivotally connected with an axis of the base rotating module, and other end of the terminal arc-link being pivotally connected with an axis of the terminal rotating module, each axis of the arc-link rotating modules being normally directed into the center of the base frame for concentrically rotating each arc-link set along a specified geometric orbit between the base frame and the terminal frames, wherein sum of arc-lengths of any two of the base arc-links is greater than or equal to an angle between their corresponding vertex-to-center lines of the base geometrical tetrahedron; wherein sum of arc-lengths of any two of the terminal arc-links is greater than or equal to an angle between their corresponding vertex-to-center lines of the terminal geometrical arc; and
    at most two crank sets, each crank set comprising an arc crank and an crank rotating module, an end of the arc crank being mounted a rod which is concentrically extended opposite side relative to the base frame, other end of the arc crank being pivoted through an axis of the base rotating module and installed into the crank rotating module opposite side relative to the base frame, and the arc crank being configured to be concentrically rotated along a geometric orbit between terminal arc-link and terminal frame; wherein the arc-length of the arc crank is less than or equal to 90°.

2. The mechanism according to claim 1, wherein each terminal frame set further comprises a terminal saddle which can be equipped onto the terminal frame's opposite side relative to terminal arc-links for carrying a payload.

3. The mechanism according to claim 1, wherein each crank set further comprises a crank saddle which can be equipped onto the arc crank's extended rod opposite side relative to the base frame for carrying a payload.

4. The mechanism according to claim 1, wherein the base rotating module can be assembled by a torque output device or an angle sensor or a bearing with an axle, the arc-link rotating module can be assembled by a torque output device or an angle sensor or a bearing with an axle, the terminal rotating module can be assembled by a torque output device or an angle sensor or a bearing with an axle, the crank rotating module can be assembled by a torque output device or an angle sensor or a bearing with an axle.

5. The mechanism according to claim 1, wherein the base frame is either closed-loop type which can be designed to enhance rigidity for preventing vibration or deformation, or open-loop type which can be designed for preventing predictable interference caused by arc-link sets or crank sets.

6. The mechanism according to claim 1, wherein the base rotating module can be assembled by a torque output device and an angle sensor and a bearing with an axle, the arc-link rotating module can be assembled by a torque output device and an angle sensor and a bearing with an axle, the terminal rotating module can be assembled by a torque output device and an angle sensor and a bearing with an axle, the crank rotating module can be assembled by a torque output device and an angle sensor and a bearing with an axle.

7. The mechanism according to claim 1, wherein the base frame is either closed-loop type which can be designed to enhance rigidity for preventing vibration and deformation, or open-loop type which can be designed for preventing predictable interference caused by arc-link sets and crank sets.

8. A mechanism geometrically constituted with twelve axes configured to be manipulated for spherical coordinate kinematics, comprising:
    a base frame set comprising a base frame including a plurality of brackets and four base rotating modules installed into the base frame, the base frame being configured with four vertexes which can be used to constitute a base geometrical tetrahedron, each axis of the base rotating module being individually coincided with a vertex-to-center line of the base geometrical tetrahedron, and these four vertex-to-center lines being coincided with an center of the base frame, wherein an angle between any two vertex-to-center lines of the base geometrical tetrahedron is greater than 75° and less than 150°;

two terminal frame sets, each terminal frame set comprising a terminal frame and two terminal rotating modules installed into the terminal frame, the terminal frame being geometrically defined by two vertexes which can be used to constitute a terminal geometrical arc, each axis of terminal rotating module being individually coincided with a vertex-to-center line of the terminal geometrical arc, and these two vertex-to-center lines being coincided with the center of the base frame for concentrically rotating the terminal frame along a specified geometric orbit, wherein the angle between the two vertex-to-center lines of the terminal geometrical arc is greater than 75° and less than 150°; and four arc-link sets, each arc-link set comprising a base arc-link, a terminal arc-link and an arc-link rotating module, an end of the base arc-link being pivotally connected with an end of the terminal arc-link through an axis of arc-link rotating module, the other end of the base arc-link being pivotally connected with an axis of the base rotating module, and the other end of the terminal arc-link being pivotally connected with an axis of the terminal rotating module, each axis of the arc-link rotating modules being normally directed into the center of the base frame for concentrically rotating each arc-link set along a specified geometric orbit between the base frame and the terminal frames, wherein sum of arc-lengths of any two of the base arc-links is greater than or equal to an angle between their corresponding vertex-to-center lines of the base geometrical tetrahedron; wherein sum of arc-lengths of any two of the terminal arc-links is greater than or equal to an angle between their corresponding vertex-to-center lines of the terminal geometrical arc.

9. The mechanism according to claim 8, wherein each terminal frame set further comprises a terminal saddle which can be equipped onto the terminal frame's opposite side relative to terminal arc-links for carrying a payload.

10. The mechanism according to claim 8, wherein the base rotating module can be assembled by a torque output device or an angle sensor or a bearing with an axle, the arc-link rotating module can be assembled by a torque output device or an angle sensor or a bearing with an axle, the terminal rotating module can be assembled by a torque output device or an angle sensor or a bearing with an axle.

11. The mechanism according to claim 8, wherein the base frame is either closed-loop type which can be designed to enhance rigidity for preventing vibration or deformation, or open-loop type which can be designed for preventing predictable interference caused by arc-link sets or crank sets.

12. The mechanism according to claim 8, wherein the base rotating module can be assembled by a torque output device and an angle sensor and a bearing with an axle, the arc-link rotating module can be assembled by a torque output device and an angle sensor and a bearing with an axle, the terminal rotating module can be assembled by a torque output device and an angle sensor and a bearing with an axle.

13. The mechanism according to claim 8, wherein the base frame is either closed-loop type which can be designed to enhance rigidity for preventing vibration and deformation, or open-loop type which can be designed for preventing predictable interference caused by arc-link sets and crank sets.

* * * * *